United States Patent
Ishikawa et al.

(10) Patent No.: US 6,501,580 B1
(45) Date of Patent: *Dec. 31, 2002

(54) METHOD AND APPARATUS FOR OPTIMIZING DISPERSION IN AN OPTICAL FIBER TRANSMISSION LINE IN ACCORDANCE WITH AN OPTICAL SIGNAL POWER LEVEL

(76) Inventors: George Ishikawa, c/o Fujitsu Limited, 1-1, Kamikodanaka 4-chome, Nakahara-ku, Kawasaki-shi, Kanagawa 211-8588 (JP); Hiroki Ooi, c/o Fujitsu Limited, 1-1, Kamikodanaka 4-chome, Nakahara-ku, Kawasaki-shi, Kanagawa 211-8588 (JP); Naoki Kuwata, c/o Fujitsu Limited, 1-1, Kamikodanaka 4-chome, Nakahara-ku, Kawasaki-shi, Kanagawa 211-8588 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,806

(22) Filed: Jul. 2, 1999

Related U.S. Application Data

(63) Continuation of application No. 09/045,040, filed on Mar. 20, 1998, now Pat. No. 6,081,360.

(30) Foreign Application Priority Data

Aug. 20, 1997 (JP) .............................................. 9-224056
Sep. 11, 1997 (JP) .............................................. 9-246901

(51) Int. Cl.$^7$ .............................................. H04B 10/00
(52) U.S. Cl. ....................... 359/161; 359/173; 359/110; 359/193; 359/135
(58) Field of Search ................................. 359/110, 161, 359/173, 179, 188, 193, 135

(56) References Cited

U.S. PATENT DOCUMENTS 5,524,144 A 6/1996 Suzuki ........................ 359/176

(List continued on next page.)

FOREIGN PATENT DOCUMENTS

EP 0 700 178 A 6/1996 ........... H04B/10/18

OTHER PUBLICATIONS

Koichi Takiguchi, Katsunari Okamoto, "Variable Group–Delay Dispersion Equalizer Using Lattice–Form Programmable Optical Filter on Planar Lightwave Circuit", IEEE: Journal of Selected Topics In Quantum Electronics, vol. 2 No. 2, Jun. 1996.

(List continued on next page.)

Primary Examiner—Leslie Pascal

(57) ABSTRACT

A method and apparatus for optimizing dispersion in an optical fiber transmission line. The method and apparatus (a) determine an optimum amount of total dispersion of an optical transmission line corresponding to a power level of an optical signal transmitted through the optical transmission line; (b) control dispersion of the optical transmission line so that the total dispersion up to a specific point along the optical transmission line becomes approximately zero; and (c) add dispersion to the optical transmission line downstream of the specific point, to obtain the determined optimum amount of total dispersion. The control of dispersion in (b), above, can be performed in several different manners. For example, the control of dispersion can include (i) detecting the intensity of a specific frequency component of the optical signal, the optical signal having an intensity v. total dispersion characteristic curve with at least two peaks; and (ii) controlling the amount of total dispersion of the transmission line to substantially minimize the intensity of the specific frequency component between the two highest peaks of the intensity v. total dispersion characteristic curve of the optical signal. Assuming that the optical signal is modulated by a data signal having a bit rate of B bits/second, then the specific frequency component is preferably a B hertz component of the optical signal.

97 Claims, 33 Drawing Sheets

U.S. PATENT DOCUMENTS

| | | | |
|---|---|---|---|
| 5,579,428 A | 11/1996 | Evans et al. | 385/124 |
| 5,717,510 A | 2/1998 | Ishikawa et al. | 359/161 |
| 6,081,360 A * | 6/2000 | Ishikawa et al. | 359/161 |

OTHER PUBLICATIONS

Sergio Barcelos, Michael N. Zervas, Richard I. Laming, "Characteristics of chirped fiber gratings for dispersion compensation", OFC '96 Technical Digest.

M.M. Ohn, A.T. Alavie, R. Maaskant, M.G. Xu, F. Bilodeau, K.O. Hill, "Tunable fiber grating dispersion using a piezoelectric stack", OFC '97 Technical Digest.

Akihide Sano, et al., "Automatic dispersion equalization by monitoring extracted–clock power level in a 40–Gbit/s, 200–km transmission line", 22nd European Conference on Optical Communication ECOC '96, Oslo.

Sano, A., et al., "Automatic dispersion equalization by monitoring extracted–clock power level in a 40–Gbit/s, 200–km transmission line," Proc. Of the 22nd European Conf. On Optical Comm, ECOC '96, Oslo, pp. 2.207 through 2.210.

* cited by examiner

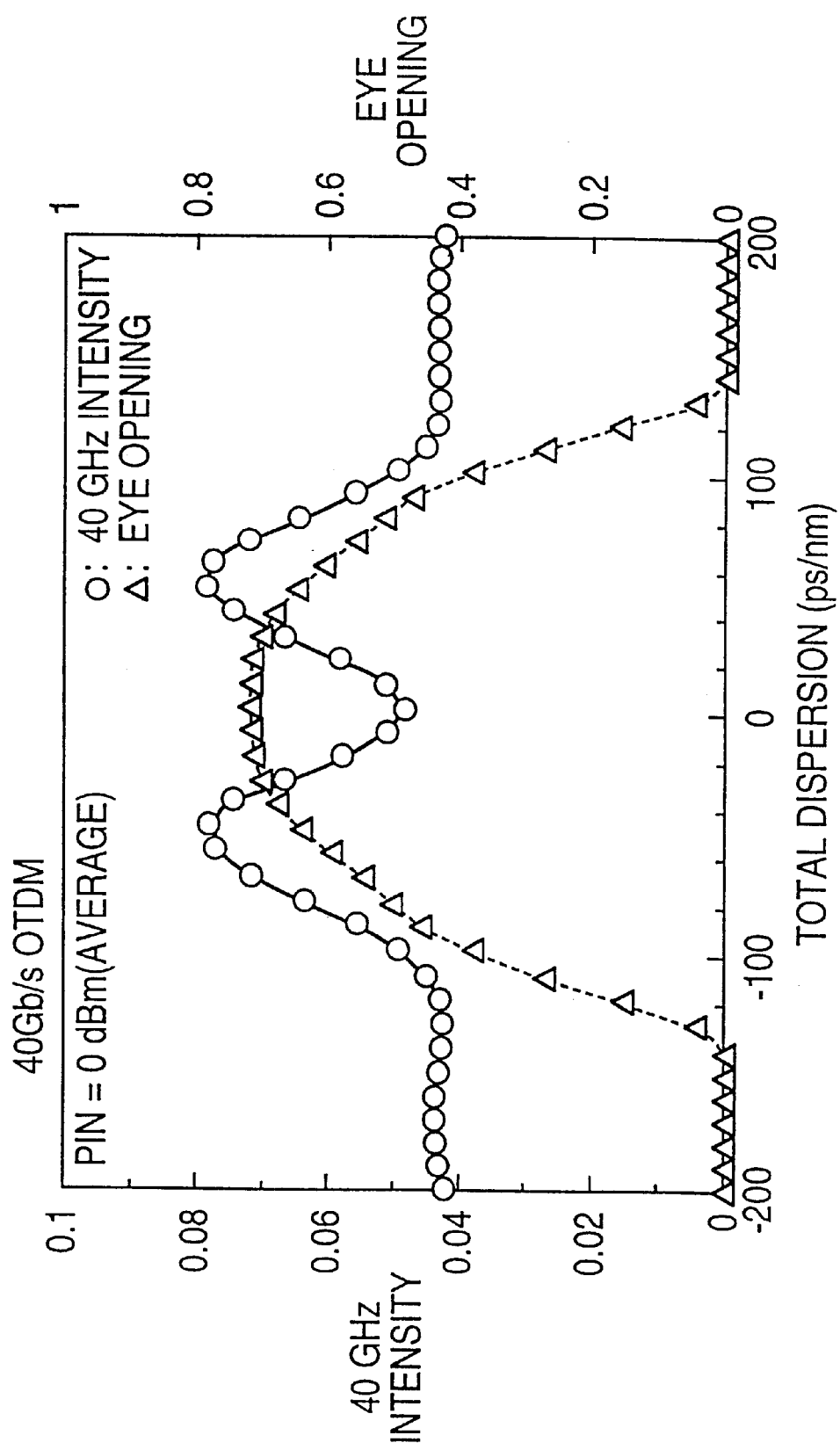

METHOD AND APPARATUS FOR OPTIMIZING DISPERSION IN AN OPTICAL FIBER TRANSMISSION LINE IN ACCORDANCE WITH AN OPTICAL SIGNAL POWER LEVEL

This application is a Continuation of application Ser. No. 09/045,040, filed Mar. 20, 1998, now allowed now U.S. Pat. No. 6,081,360.

CROSS-REFERENCE TO RELATED APPLICATIONS

This application is based on, and claims priority to, Japanese application number 9-246901, filed on Sep. 11, 1997, in Japan, and which is incorporated herein by reference.

This application also claims priority to Japanese application 9-224056, filed on Aug. 20, 1997, in Japan, and which is incorporated herein by reference.

This application is related to U.S. application titled "METHOD AND APPARATUS FOR MINIMIZING THE INTENSITY OF A SPECIFIC FREQUENCY COMPONENT OF AN OPTICAL SIGNAL TRAVELLING THROUGH AN OPTICAL FIBER TRANSMISSION LINE TO THEREBY MINIMIZE THE TOTAL DISPERSION", filed on Mar. 19, 1998, in the United States, and which is incorporated herein by reference.

BACKGROUND OF THE INVENTION

1. Field of the Invention

The present invention relates to a method and apparatus for optimizing dispersion in an optical fiber transmission line in accordance with the power level of an optical signal travelling through the optical fiber transmission line. More specifically, the present invention relates to a method and apparatus which sets the dispersion at a specific point along the optical fiber transmission line to zero, and then adds dispersion downstream of the specific point to optimize the total dispersion in accordance with the power level of the optical signal.

2. Description of the Related Art

Optical transmission systems using fiber optical transmission lines are being used to transmit relatively large amounts of information. For example, optical transmission systems at 10 Gb/s are now in practical implementation in trunk-line optical communications. However, as users require larger amounts of information to be rapidly transmitted, a further increase in the capacity of optical transmission systems is required.

Time-division multiplexing (TDM) (including optical time-division multiplexing (OTDM)) and wavelength-division multiplexing (WDM) are being considered as candidates for such high capacity optical transmission systems. For example, with regard to TDM techniques, a significant amount of worldwide research is being performed on 40 Gb/s systems.

Chromatic dispersion (group-velocity dispersion (GVD)) is one of the factors limiting the transmission distance in a 40 Gb/s system. Since dispersion tolerance is inversely proportional to the square of the bit rate, the dispersion tolerance, which is about 800 ps/nm at 10 Gb/s, is reduced by a factor of 16 to about 50 ps/nm at 40 Gb/s.

For example, in measured experiments, an optical time-division multiplexed (OTDM) signal with a signal light wavelength of 1.55 $\mu$m (where transmission loss in silica fiber is the lowest) was transmitted over a distance of 50 km through a single-mode fiber (SMF). The SMF had a zero dispersion wavelength of 1.3 $\mu$m. This type of SMF is the type of fiber most widely installed around the world. The input signal light power was +3 dBm, and the bit rate was 40 Gb/s. Dispersion compensation was performed using a dispersion-compensating fiber (DCF). The width of the dispersion compensation value range allowed in order to hold the power penalty (degradation of optical signal reception sensitivity through transmission) to within 1 dB (dispersion compensation tolerance) was 30 ps/nm. This value translates to length of 2 km or less of an SMF with a chromatic dispersion value of 18.6 ps/nm/km.

Furthermore, in a land system, repeater spacing is not uniform. Thus, very precise dispersion compensation must be performed for each repeater section.

On the other hand, dispersion in a transmission line changes with time due to changes, for example, in temperature. For example, in the case of an SMF 50 km transmission, when the temperature changes between −50 to 100° C., the amount of change of the transmission line dispersion is estimated to be as follows:

(Temperature dependence of zero dispersion wavelength of transmission line)×(Temperature change)×(Dispersion slope)×(Transmission distance)=0.03 nm/° C.×150° C.×0.07 ps/nm$^2$/km×50 km=16 ps/nm.

This value is greater than one half of the dispersion tolerance of 30 ps/nm and cannot be overlooked when designing the system.

In the above-described measured experiments, when the amount of dispersion compensation was optimized at −50° C. at the start of system operation, if the temperature subsequently rose to 100° C. during system operation, the criterion of a 1 dB penalty could not be satisfied (worst case condition).

Further, depending on the characteristic and construction of a dispersion compensator, the amount of dispersion compensation can only be set discretely, sometimes leaving no alternative but to set the dispersion compensation amount to a value slightly displaced from an optimum value at the start of system operation. In that case, there arises a possibility that the criterion of 1 dB penalty may not be satisfied even when the temperature change is smaller than 150° C.

SUMMARY OF THE INVENTION

Accordingly, it is an object of the present invention to provide an automatic dispersion compensation system for use in ultra high-speed optical transmission systems at 40 Gb/s or higher rates.

It is a further object of the present invention to provide such an automatic dispersion compensation system so as to optimize the amount of dispersion compensation for each repeater section of the optical transmission system at the start of system operation, and also to perform optimization of the dispersion compensation amount according to the changing dispersion value of the transmission line during system operation.

It is an additional object of the present invention to provide such an automatic dispersion compensation system for SMF transmission systems, but that can also be used in other systems that use 1.55 $\mu$m band dispersion-shifted fiber (DSF) having a low chromatic dispersion value at that wavelength.

Moreover, it is an object of the present invention to provide a dispersion control method and apparatus that can properly control chromatic dispersion in an optical transmission line even when signal light power is so large that nonlinear effect becomes pronounced.

Objects of the present invention are achieved by providing a method and apparatus which (a) determines an optimum amount of total dispersion of an optical transmission line corresponding to a power level of an optical signal transmitted through the optical transmission line; (b) controls dispersion of the optical transmission line so that the total dispersion up to a specific point along the optical transmission line becomes approximately zero; and (c) adds dispersion to the optical transmission line to obtain the determined optimum amount of total dispersion. When adding dispersion, the dispersion can be added to the optical transmission line at a point which is downstream of the specific point.

The process of controlling dispersion in (b), above, can be performed in several different manners. The example, the process of controlling dispersion can include (i) detecting the intensity of a specific frequency component of the optical signal, the optical signal having an intensity v. total dispersion characteristic curve with at least two peaks; and (ii) controlling the amount of total dispersion of the transmission line to substantially minimize the intensity of the specific frequency component between the two highest peaks of the intensity v. total dispersion characteristic curve of the optical signal. Assuming that the optical signal is modulated by a data signal having a bit rate of B bits/second, then the specific frequency component is preferably a B hertz component of the optical signal.

Alternatively, the process of controlling dispersion in (b), above, can include (i) detecting the intensity of a specific frequency component of the optical signal, the optical signal having an intensity v. total dispersion characteristic curve with at least two peaks; and (ii) controlling the amount of total dispersion of the transmission line so that the intensity of the specific frequency component is at a midpoint between the two highest peaks of the intensity v. total dispersion characteristic curve of the optical signal.

Further, the process of controlling dispersion in (b), above, can include (i) detecting the intensity of a specific frequency component of the optical signal, the optical signal having an intensity v. total dispersion characteristic curve with a corresponding eye opening; and (ii) controlling the amount of total dispersion of the optical transmission line to substantially minimize the intensity of the specific frequency component in the eye opening.

Moreover, the process of controlling dispersion in (b), above, can include (i) detecting the intensity of a specific frequency component of the optical signal, the optical signal having an intensity v. total dispersion characteristic curve with a corresponding, allowable eye opening range; and (ii) controlling the amount of total dispersion of the transmission line to maintain the intensity of the specific frequency component along a point on the intensity v. total dispersion characteristic curve which is within the eye opening.

Objects of the present invention are also achieved by providing a method and apparatus of controlling dispersion in an optical transmission line having an optical signal transmitted therethrough. The method and apparatus (a) set the power of the optical signal to a first value producing substantially no nonlinear effect in the optical transmission line; (b) control the amount of total dispersion of the optical transmission line to be approximately zero; (c) change the power of the optical signal to a second value different from the first value; (d) determine an optimum amount of total dispersion of the optical transmission line corresponding to the power of the optical signal being at the second value; and (e) add dispersion to the optical transmission line to obtain the determined optimum amount of dispersion.

Objects of the present invention are further achieved by providing a method and apparatus of controlling dispersion in an optical transmission line having an optical signal transmitted therethrough. The method and apparatus (a) set the power of the optical signal to a value producing substantially no nonlinear effect in the optical transmission line; (b) control the amount of total dispersion of the optical transmission line to be approximately zero while the power is set to said value; (c) increase the power of the optical signal; and (d) add dispersion to the optical transmission line to obtain an optimum amount of dispersion corresponding to the increased power of the optical signal. The process of controlling the amount of total dispersion can take the form of any of the processes described above for controlling dispersion.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 11 is a graph illustrating a computer simulation of the dependence of 40 GHz clock component intensity on the amount of total dispersion for the 40 GHz OTDM signal when signal light power is 0 dBm, according to an embodiment of the present invention.

DESCRIPTION OF THE PREFERRED EMBODIMENTS

Figure 1:
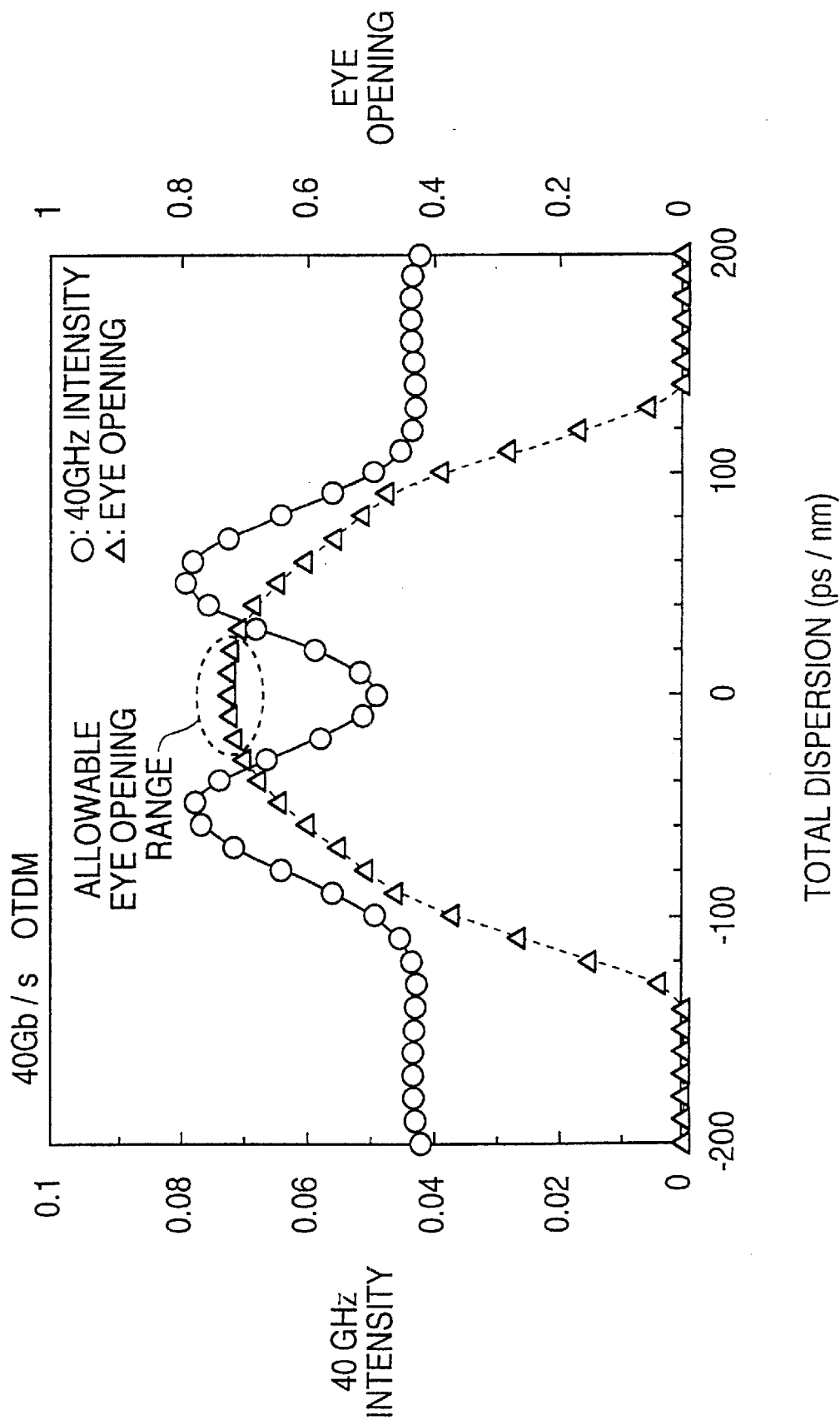
FIG. 1 is a graph illustrating computer simulation results of the dependence of a 40 GHz clock component intensity on the amount of total dispersion for a 40 Gb/s OTDM signal, according to an embodiment of the present invention.

Reference will now be made in detail to the present preferred embodiments of the present invention, examples of which are illustrated in the accompanying drawings, wherein like reference numerals refer to like elements throughout.

From the Description of the Related Art section, above, it can be seen that the implementation of an ultra high-speed optical transmission system at 40 Gb/s or higher rates requires the construction of an "automatic dispersion compensation system" which not only optimizes the amount of dispersion compensation for each repeater section at the start of system operation but also performs optimization of the dispersion compensation amount according to the changing dispersion value of the transmission line during system operation. Such an automatic dispersion compensation system is needed not only for SMF transmission systems but for other systems that use 1.55 $\mu$m band dispersion-shifted fiber (DSF) having a low chromatic dispersion value at that wavelength.

Techniques essential for the implementation of an automatic dispersion compensation system can be summarized into the following three points:

(i) Realization of a variable dispersion compensator;

(ii) Method for monitoring chromatic dispersion (or the amount of total dispersion after dispersion compensation) in a transmission line; and (iii) Feedback optimization control method for the variable dispersion compensator.

Regarding item (ii), a method for measuring chromatic dispersion in an optical fiber, a pulse method or a phase method has traditionally been used that involves providing a plurality of light beams of different wavelengths to the optical fiber and measuring group-delay differences or phase differences between the output beams. However, to constantly measure the dispersion using these methods during system operation, a set of chromatic dispersion measuring devices must be provided for each repeater section. Further, to measure the dispersion amount without interrupting the transmission of data signal light, measuring light of a wavelength different from that of the data signal light must be wavelength-division multiplexed.

Incorporating the pulse method or phase method into an optical transmission apparatus is not practical in terms of size and cost. Furthermore, when using a wavelength different from the main signal light wavelength, since the process involves estimating the dispersion value at the signal light wavelength from the measured value at the measuring light wavelength, the result may lack accuracy. Therefore, a method that can measure the chromatic dispersion value directly from the main signal light is desirable.

As a method that can achieve this measurement, the inventor of the present invention has proposed, in Japanese Patent Unexamined Publication No. 9-224056, which is incorporated herein by reference, a method that utilizes the total-dispersion dependence of the intensity of a 40 GHz component in the baseband spectrum of an NRZ (non-return-to-zero) signal and an OTDM signal (described later). More specifically, the method utilizes the characteristic that when the amount of total dispersion is zero, the intensity of the 40 GHz component is at a minimum and the eye opening at that time is the largest, and through feedback, sets the operating point of the variable dispersion compensator to a point where the intensity of the 40 GHz component is at a minimum.

However, as will be described in detail later, the amount of total dispersion at which the intensity of the 40 GHz component is at a minimum coincides with the amount of total dispersion at which the eye opening is the largest only in the case of linear transmission with a small signal light power. As the signal light power increases, a nonlinear effect (=self-phase modulation effect: SPM) becomes larger and the displacement between the two increases. It is therefore difficult to optimize the dispersion compensation amount using the above control method. As the transmission speed increases, the transmitting optical power must be increased to maintain the required optical SNR and transmit/receive level difference, making the transmission more prone to the nonlinear effect, and therefore this problem cannot be overlooked.

As for return-to-zero (RZ) signals, it is reported in A. Sano et al., ECOC '96 Technical Digests Tud. 3.5, that the 40 GHz component is at a maximum near zero total dispersion and the dispersion value at the maximum point shifts due to the nonlinear effect.

Figure 2:
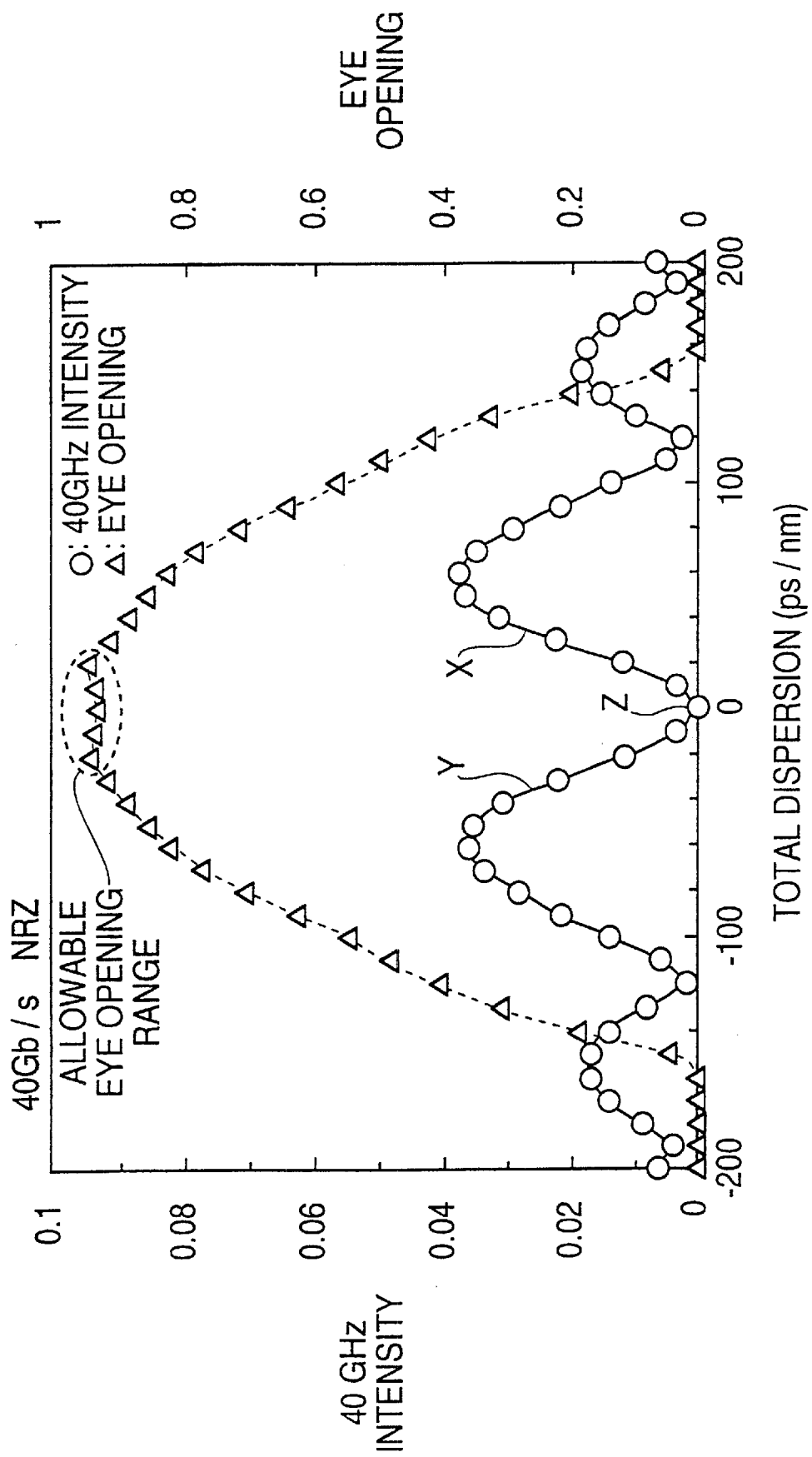
FIG. 2 is a graph illustrating computer simulation results of the dependence of a 40 GHz clock component intensity on the amount of total dispersion for a 40 Gb/s NRZ signal, according to an embodiment of the present invention.
Figure 3:
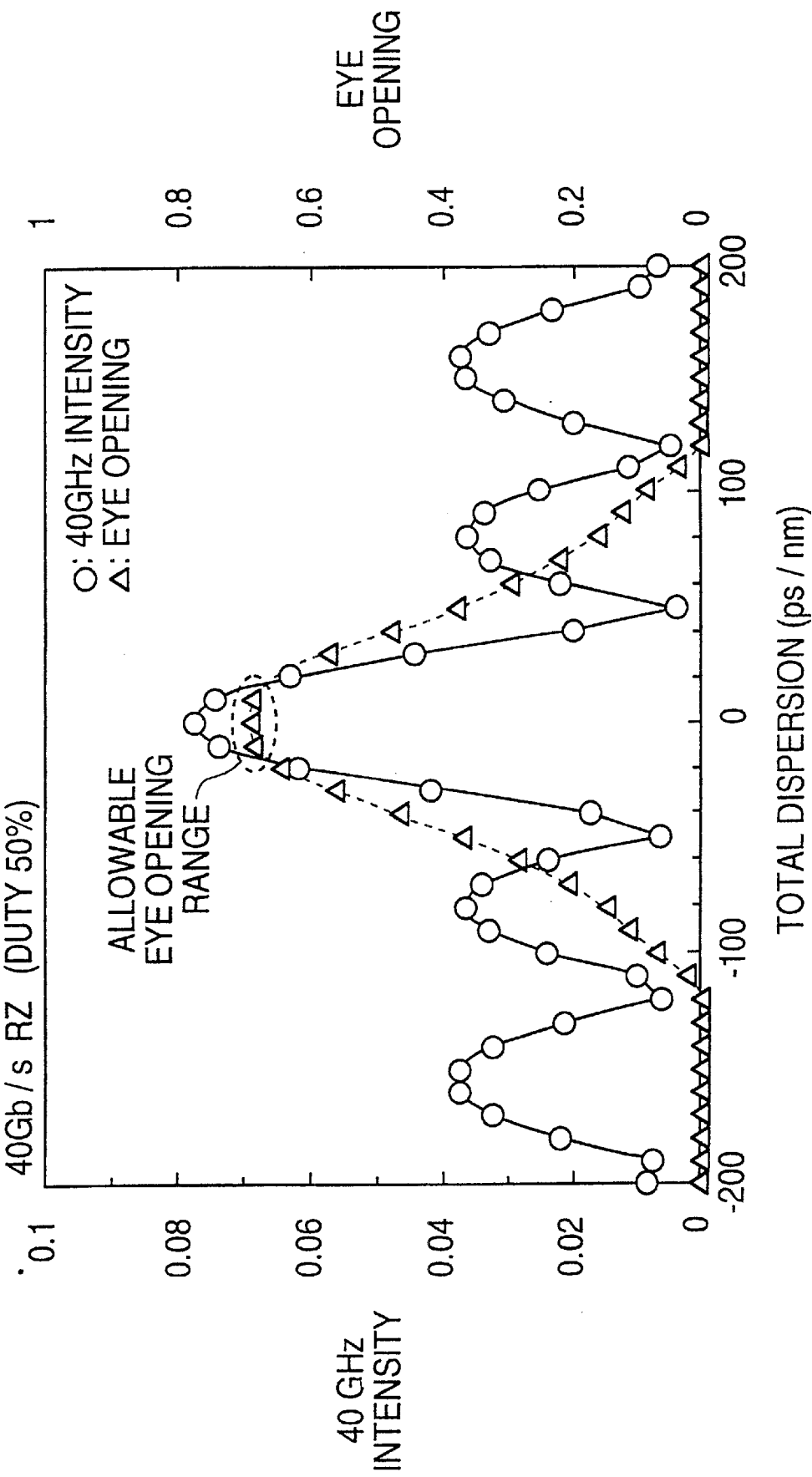
FIG. 3 is a graph illustrating computer simulation results of the dependence of a 40 GHz clock component intensity on the amount of total dispersion for a 40 Gb/s RZ signal (50% duty), according to an embodiment of the present invention.
Figure 4:
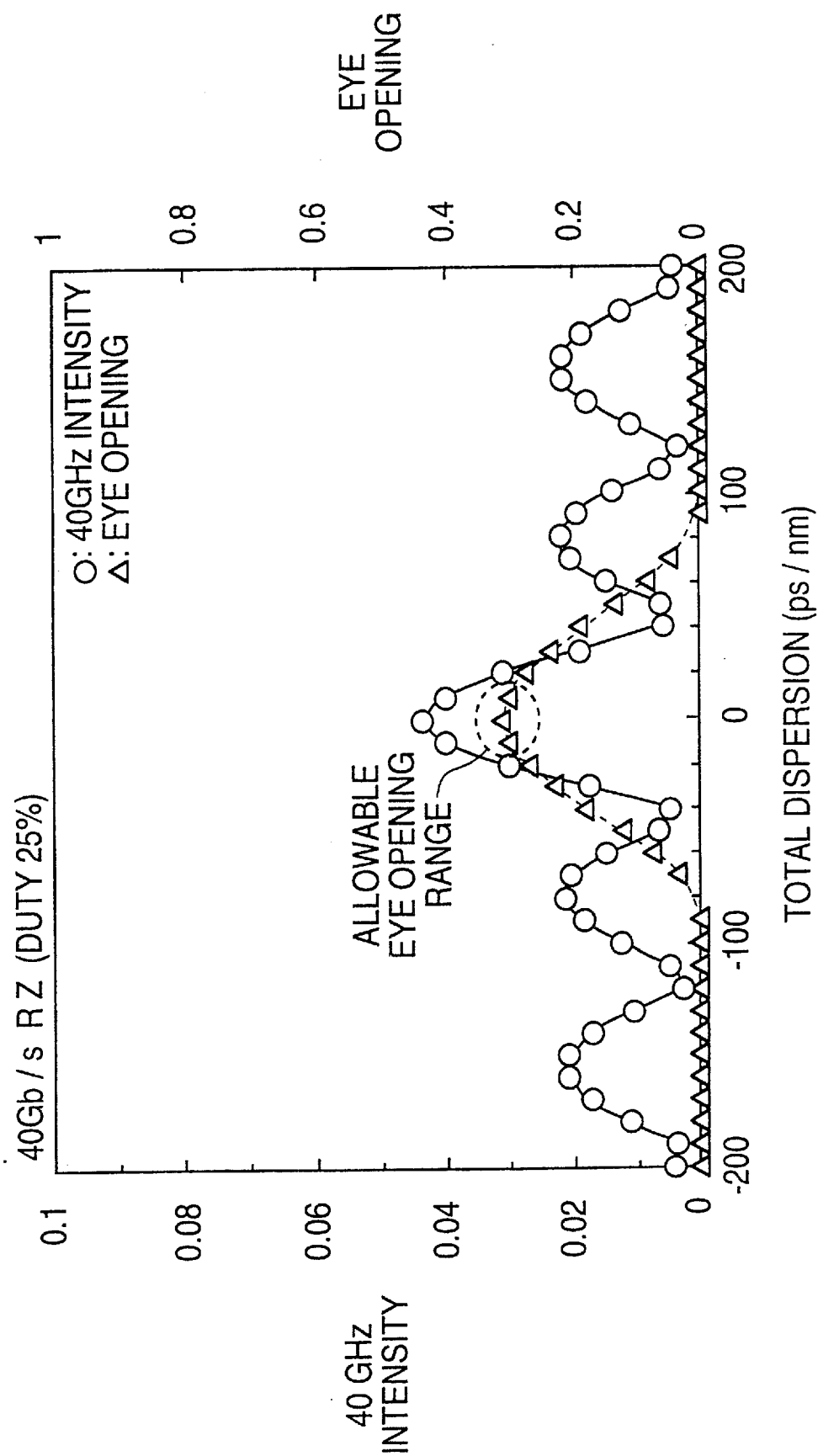
FIG. 4 is a graph illustrating computer simulation results of the dependence of a 40 GHz clock component intensity on the amount of total dispersion for a 40 Gb/s RZ signal (25% duty), according to an embodiment of the present invention.

FIG. 1 is a diagram illustrating computer simulation results of the total-dispersion dependence of the intensity of a 40 GHz component in the baseband spectrum of an OTDM signal with a data signal bit rate of 40 GHz. FIG. 2 is a diagram illustrating computer simulation results of the total-dispersion dependence of the intensity of a 40 GHz component in the baseband spectrum of an NRZ optical signal with a data signal bit rate of 40 GHz. FIG. 3 is a diagram illustrating computer simulation results of the total-dispersion dependence of the intensity of a 40 GHz component in the baseband spectrum of an RZ optical signal (50% duty) with a data signal bit rate of 40 GHz. FIG. 4 is a diagram illustrating computer simulation results of the total-dispersion dependence of the intensity of a 40 GHz component in the baseband spectrum of an RZ optical signal (25% duty) with a data signal bit rate of 40 GHz.

FIGS. 1–4 also show an eye opening in the direction of amplitude. In FIGS. 1–4, input light power was −5 dBm on average, and SMF length was 50 km. The amount of total dispersion was varied by varying the amount of dispersion in a DCF connected in series to the SMF. Around a peak of the eye opening v. the total dispersion curve, values of the eye opening are substantially kept constant near the optimum value. These ranges are called allowable eye opening ranges.

Figure 5:
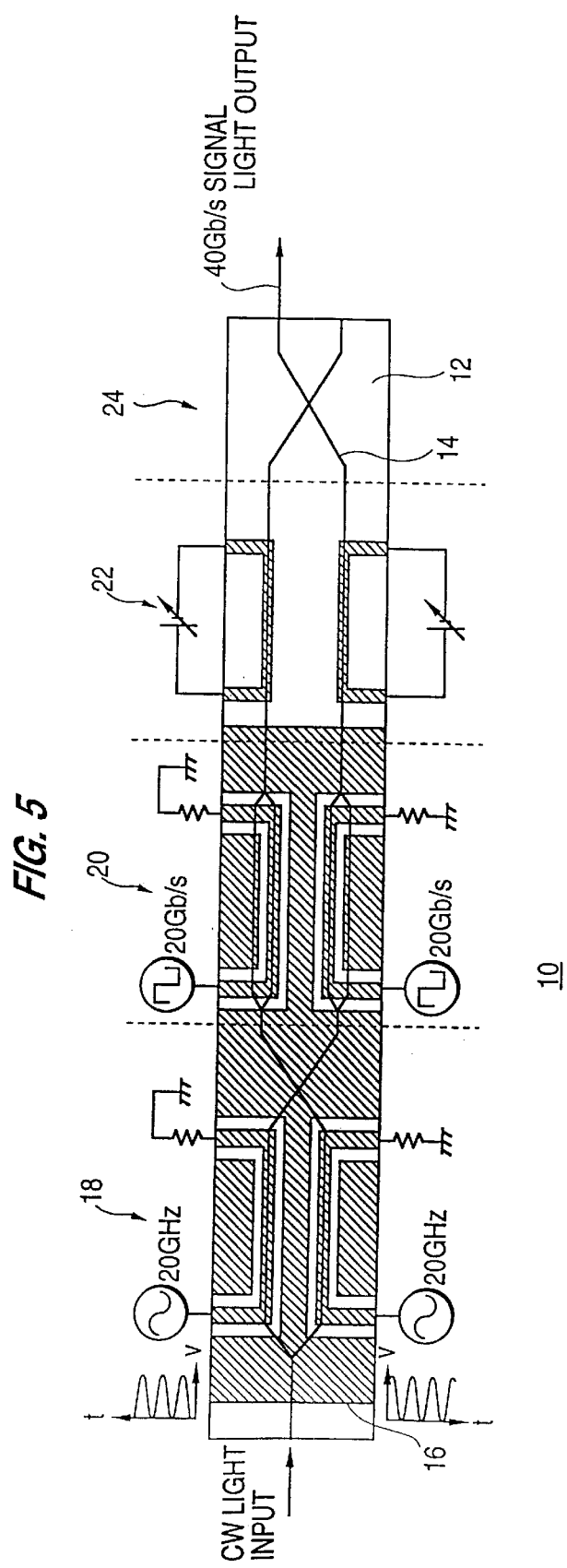
FIG. 5 is a diagram illustrating an optical modulator that generates a 40 Gb/s OTDM signal, according to an embodiment of the present invention.

FIG. 5 is a diagram illustrating an optical modulator 10 that generates the 40 Gb/s OTDM signal, according to an embodiment of the present invention. Referring now to FIG. 5, optical waveguides 14 are formed, for example, by thermally diffusing Ti into a LiNbO$_3$ substrate 12, on top of which an electrode pattern 16 (shown by hatching in FIG. 5) is formed, for example, using Au. Thus, the optical modulator 10 includes a one-input, two-output optical switch 18, a data modulator 20 having two independent optical modulators, a phase controller 22, and an optical multiplexer 24.

FIGS. 6(A), 6(B), 6(C), 6(D) and 6(E) are waveform diagrams indicating the operation of optical modulator 10, according to an embodiment of the present invention.

Figure 6:
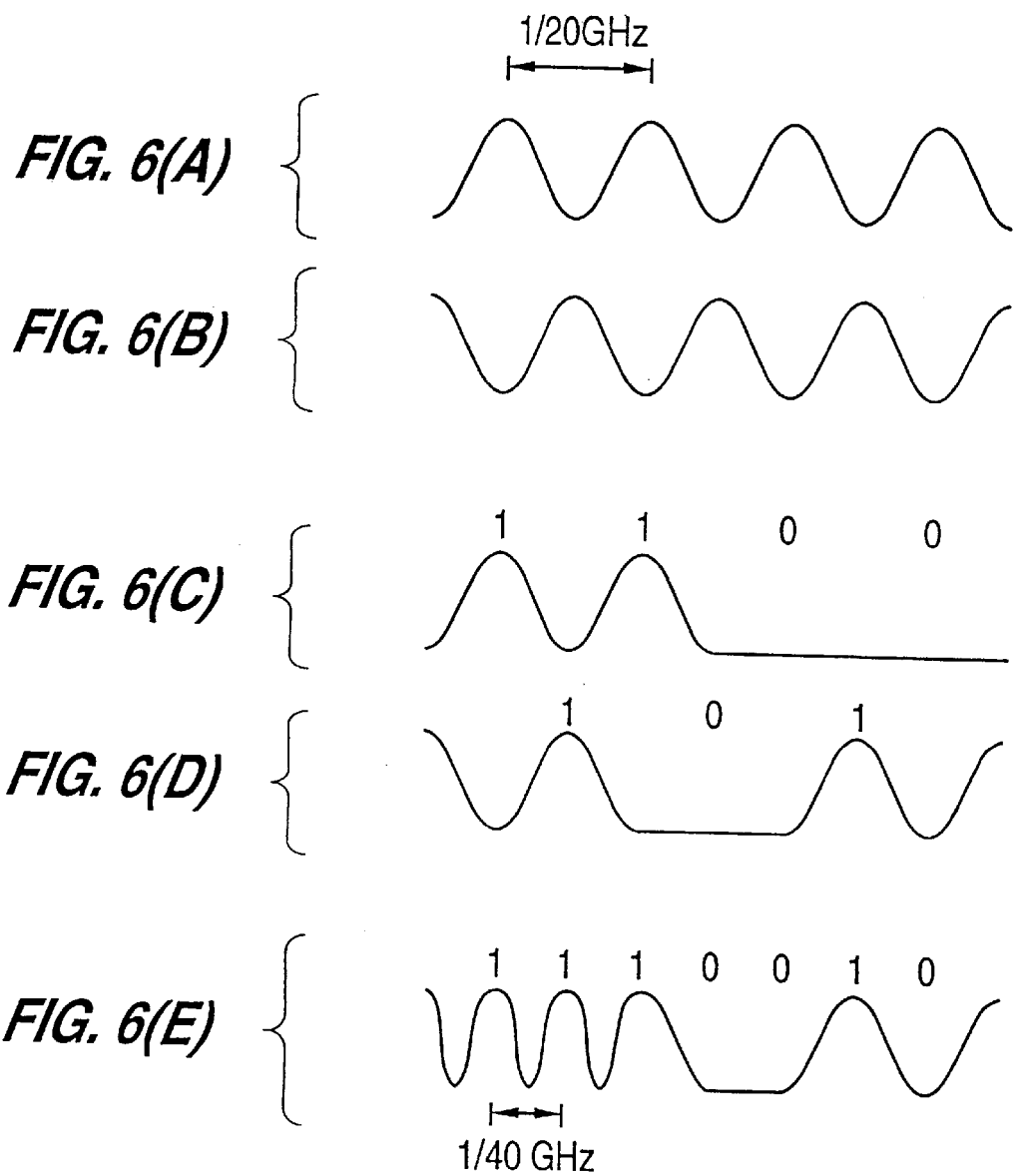
FIGS. 6(A), 6(B), 6(C), 6(D) and 6(E) are waveform diagrams indicating the operation of the optical modulator of FIG. 5, according to an embodiment of the present invention.

Referring now to FIGS. 5, 6(A), 6(B), 6(C), 6(D) and 6(E), when continuous light is input into the optical waveguides in the one-input, two-output switch 18, and 20 GHz clocks phase-shifted by 180° are applied to the two electrodes, the 180° out-of-phase optical clock signals shown in FIGS. 6(A) and 6(B) are output from optical switch 18. These signals are then input into the two optical modulators in data modulator 20. A 20 Gb/s data signal is applied to each of the two light modulators, and the RZ signals shown in FIGS. 6(C) and 6(D) are output from data modulator 20. Phase controller 22 adjusts the phases of the light waves so that the phase difference between the two light waves is 180°, and these light waves are combined in optical multiplexer 24. Since the phase difference between the two light waves is 180°, in portions where "1"s appear successively, the tails cancel each other so that the waveform becomes close to that of an RZ signal, as shown in FIG. 6(E). In other portions where at least one of adjacent bits is a "0", the waveform becomes close to that of an NRZ signal.

In FIGS. 3 and 4, for the RZ signals represented by these figures, it is shown that the intensity of the 40 GHz component is the greatest when the amount of total dispersion is zero.

By contrast, in FIG. 1, for the OTDM signal represented by this figure, it is shown that the intensity of the 40 GHz component is at a minimum in the eye opening when the total dispersion amount is zero. Similarly, in FIG. 2, for the NRZ signal represented by the figure, it is shown that the intensity of the 40 GHz component is at a minimum in the eye opening when the total dispersion amount is zero.

Figure 7:
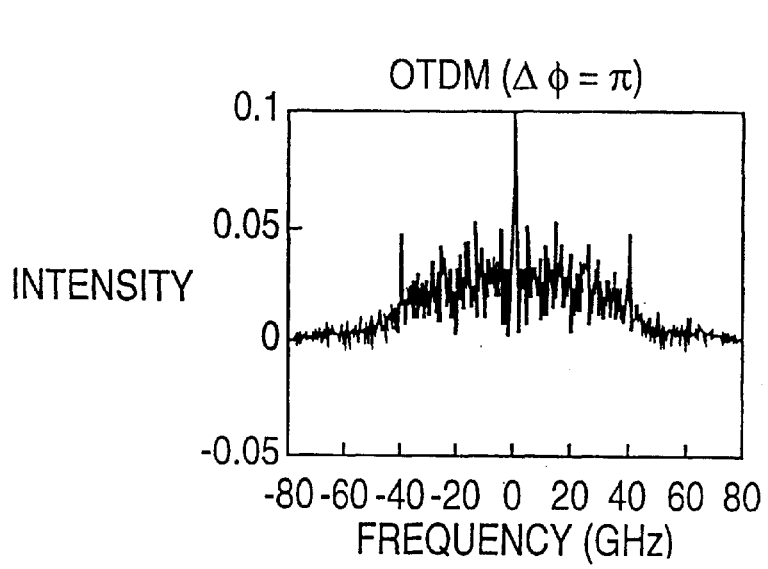
FIG. 7 is a baseband spectrum of an OTDM signal, according to an embodiment of the present invention.
Figure 8:
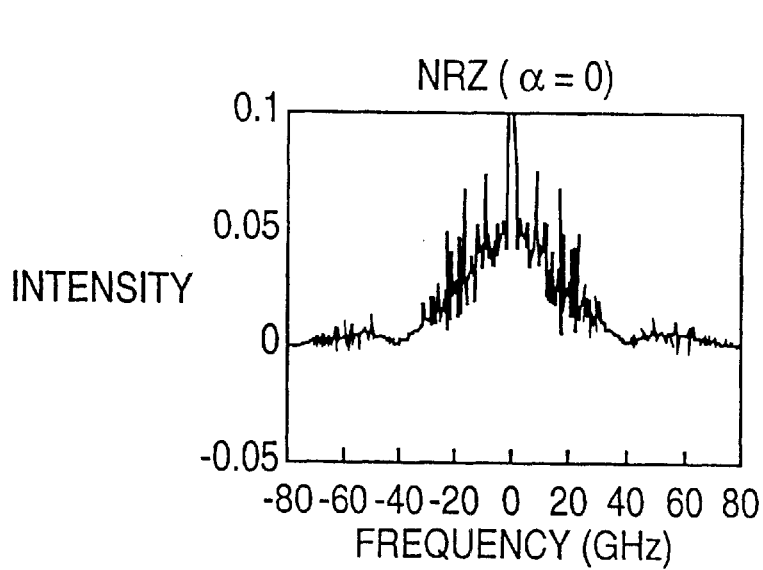
FIG. 8 is a baseband spectrum of an NRZ signal, according to an embodiment of the present invention.

For reference purposes, the baseband spectra of optical modulated signals are shown in FIGS. 7 and 8 for OTDM and NRZ, respectively. In the case of NRZ, there is no 40 GHz component, but it is presumed from a qualitative point of view that the 40 GHz component occurs because of the spectrum spreading after chromatic dispersion.

Figure 9C:
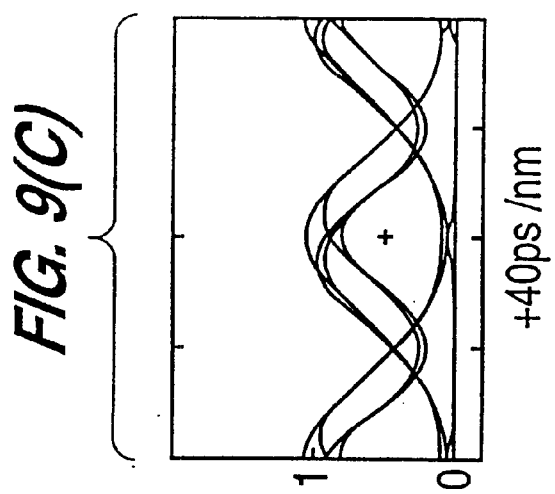
FIGS. 9(A), 9(B) and 9(C) are waveform diagrams of an OTDM signal after being subjected to chromatic dispersion, according to an embodiment of the present invention.
Figure 9B:
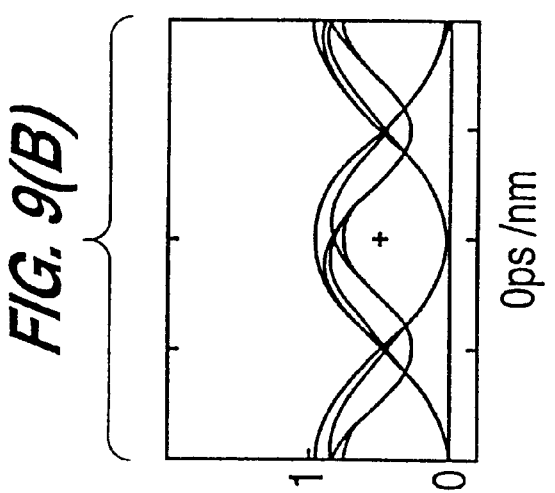
Figure 9A:
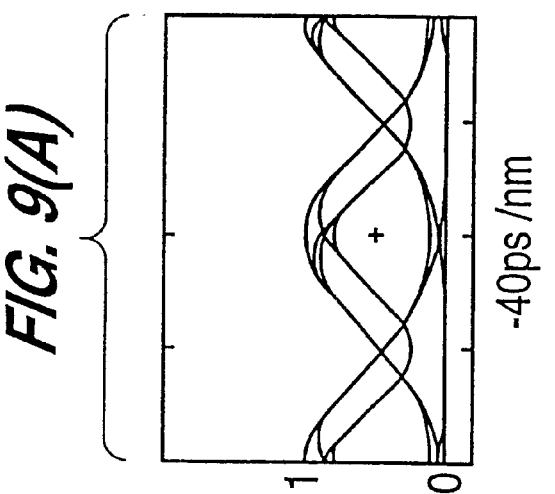
Figure 10C:
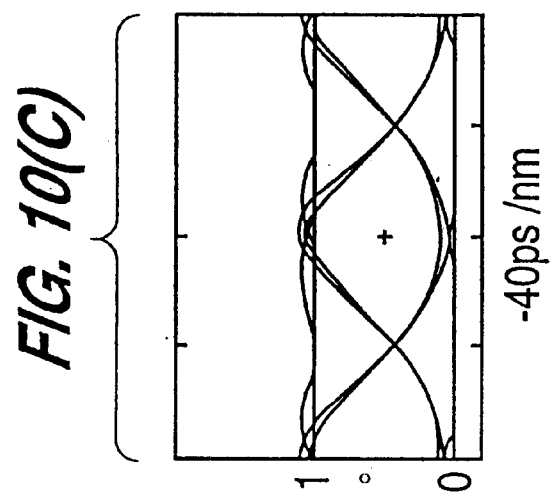
FIGS. 10(A), 10(B) and 10(C) are waveform diagrams of an NRZ signal after being subjected to chromatic dispersion, according to an embodiment of the present invention.
Figure 10B:
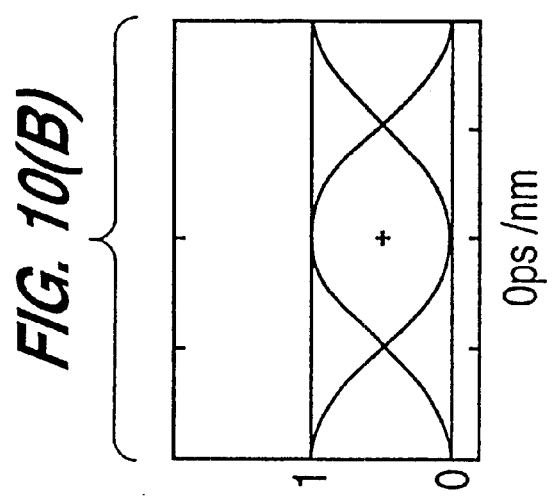
Figure 10A:
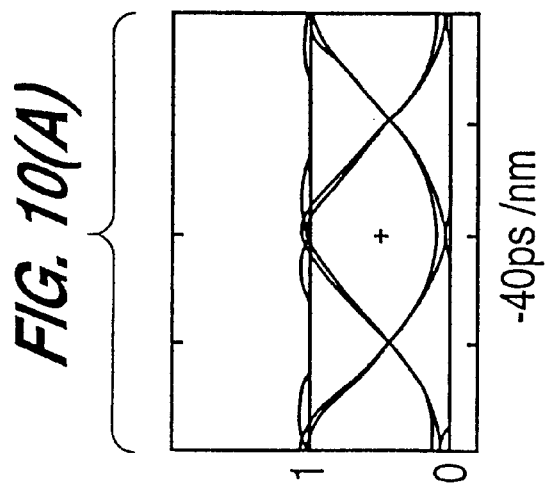
Figure 12:
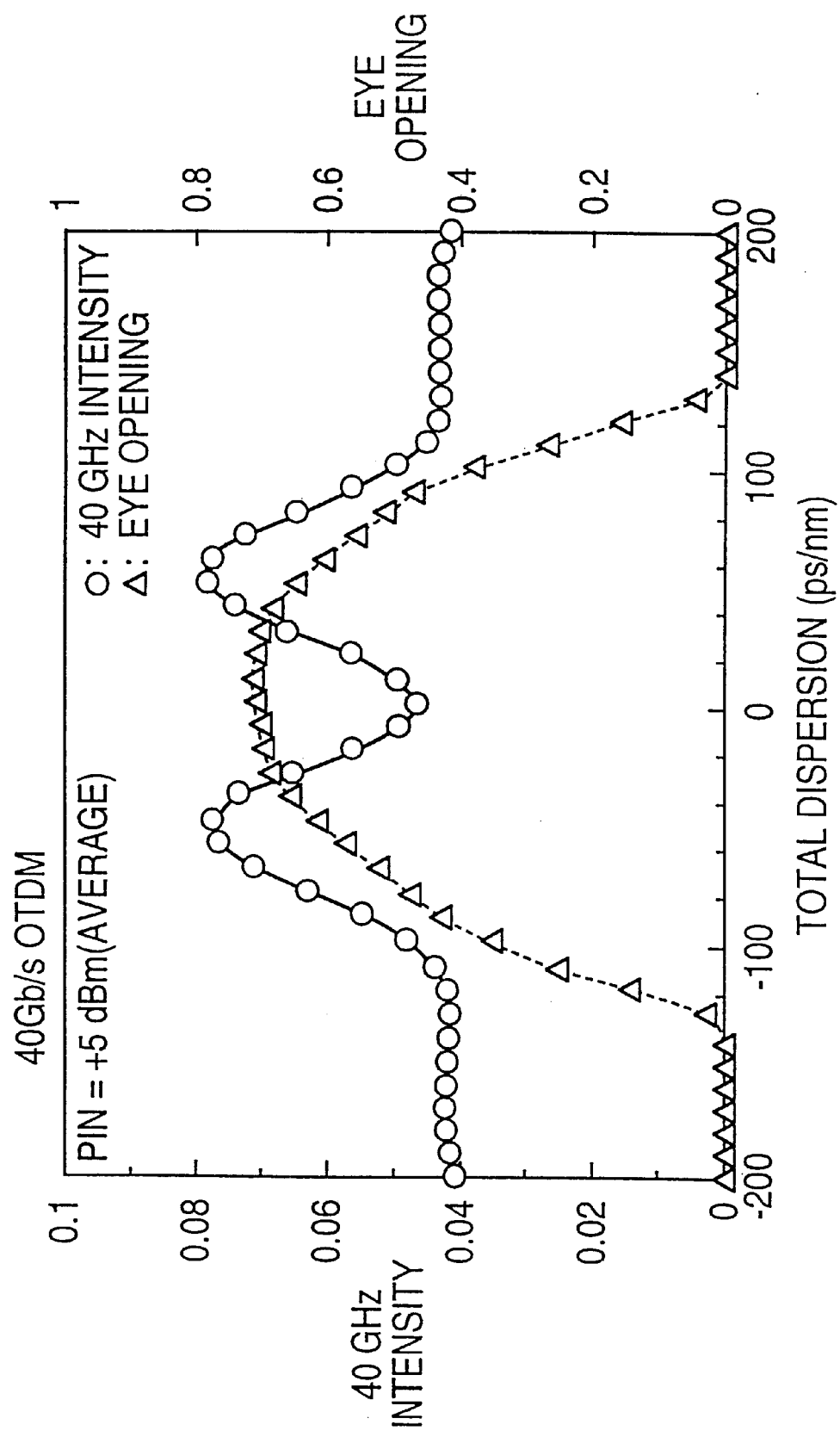
FIG. 12 is a graph illustrating a computer simulation of the dependence of 40 GHz clock component intensity on the amount of total dispersion for the 40 GHz OTDM signal when signal light power is +5 dBm, according to an embodiment of the present invention.
Figure 13:
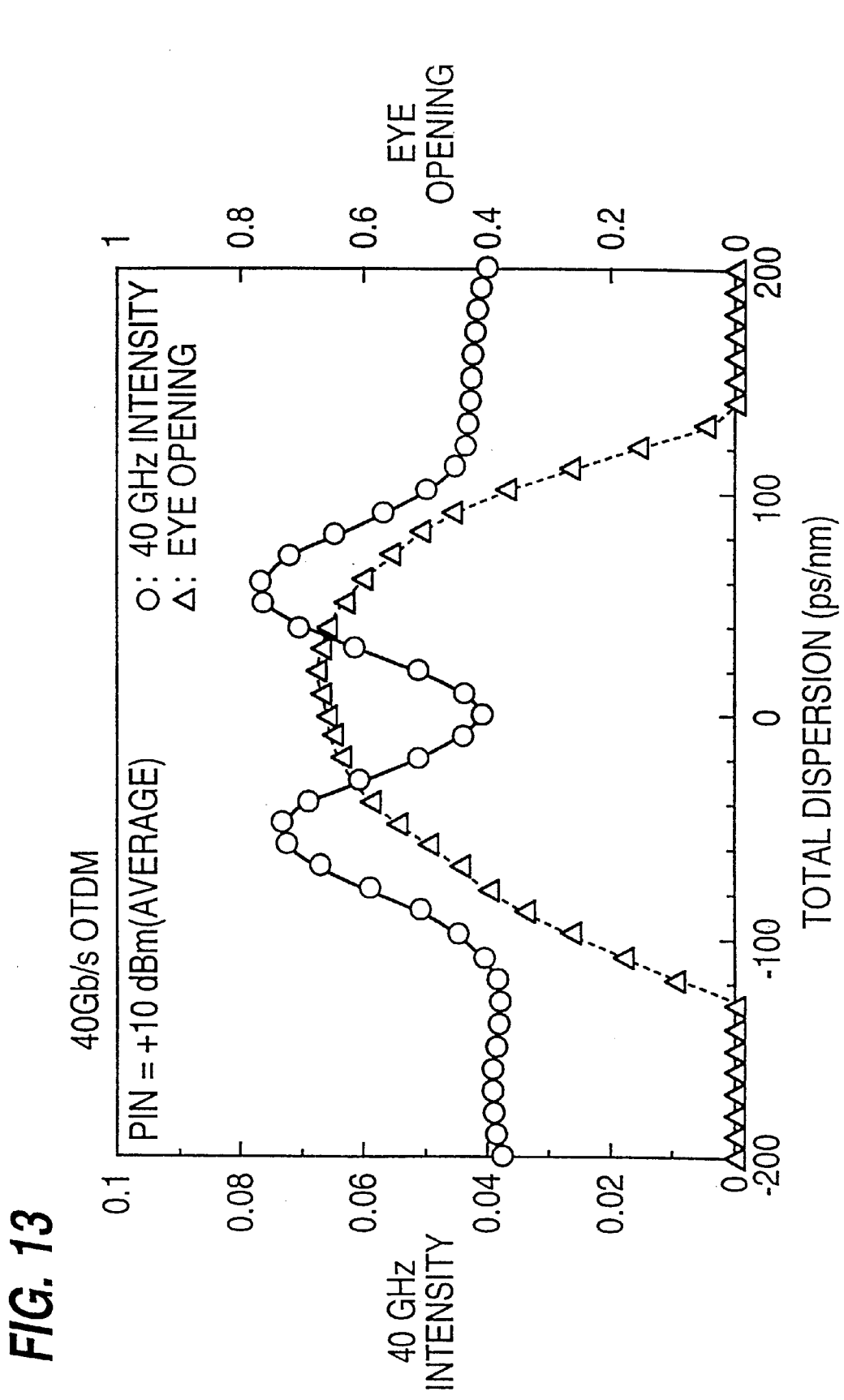
FIG. 13 is a graph illustrating a computer simulation of the dependence of 40 GHz clock component intensity on the amount of total dispersion for the 40 GHz OTDM signal when signal light power is +10 dBm, according to an embodiment of the present invention.

Waveforms (equalized waveforms) after subjected to dispersions of −40, 0, and +40 ps/nm are shown in FIGS. 9(A), 9(B) and 9(C), respectively, for OTDM. Similarly, waveforms (equalized waveforms) after subjected to dispersions of −40, 0, and +40 ps/nm are shown in FIGS. 10(A), 10(B) and 10(C), respectively, for NRZ. As shown, for both OTDM and NRZ, after dispersion (positive and negative) the "1" level at the center of the waveform rises but the cross points lower, from which it can be seen that the variation of intensity occurs with a cycle equal to the length of one slot time, thus creating the 40 GHz component.

Regarding item (i) (realization of a variable dispersion compensator), above, it follows that when transmitting an optical signal whose bit rate is generally represented by B b/s and whose B hertz component is at a minimum at zero dispersion, the amount of total dispersion can be set to zero if the control point where the B Hz component of the received optical signal is at a minimum in the eye opening can be detected by varying the control points of a variable dispersion device, such as the amount of dispersion compensation and the signal light wavelength. Besides the B Hz component, other frequency components such as a harmonic of the B Hz can be used to perform similar control.

Further, as is apparent from FIGS. 1 and 2, there are two maximum points, or highest peaks, at symmetrical positions on both sides of a minimum point in each of the OTDM and NRZ waveforms. Therefore, in cases where it is difficult to detect a minimum point, the amount of total dispersion can be set to zero by detecting the control points of the variable dispersion compensation device that provide the two maximum points and by taking the midpoint between them.

Further, in the case of an OTDM signal modulated by an n·m bit/s data signal obtained by time-division multiplexing n RZ signals each amplitude-modulated by an m bit/s signal, an m hertz component may be extracted and the total dispersion of the transmission line may be controlled so that the m hertz component comes to a maximum. Such control can be performed instead of extracting an n·m hertz component and controlling the total dispersion of the transmission line so that the n·m hertz component comes to a minimum, as described above. The reason for this is that the m bit/s RZ signals constituting the OTDM signal each contain an m hertz component, and as can be seen from FIGS. 3 and 4, that component is at a maximum when the amount of total dispersion is zero. More specifically, in this case, the n·m hertz component or the m hertz component is extracted, and the amount of total dispersion of the transmission line is controlled so that the n·m hertz component or the m hertz component comes to a minimum or a maximum, respectively.

Therefore, according to embodiments of the present invention, and as will be seen in more detail below, the present invention provides a method and apparatus for controlling dispersion in a transmission line. More specifically, the intensity of a specific frequency component of an optical signal transmitted through the transmission line is detected. The optical signal has an intensity v. total dispersion characteristic curve with a corresponding eye opening. See, for example, FIGS. 1 and 2. The amount of total dispersion of the transmission line is controlled to substantially minimize the intensity of the specific frequency component in the eye opening. As a result, as illustrated, for example, in FIGS. 1 and 2, the dispersion will be minimized by minimizing the intensity of the specific frequency component in the eye opening.

In actual practice, it is very difficult to measure the eye opening, so it would be difficult to determine if the intensity of a specific frequency component was actually minimized in the eye opening. As a result, the required control may be difficult to achieve.

Therefore, referring, for example, to FIGS. 1 and 2, an optical signal such as an OTDM or an NRZ signal can be described as having an intensity v. total dispersion characteristic curve with at least two peaks. The amount of total dispersion of the transmission line can then be controlled to substantially minimize the intensity of the specific frequency component between the two highest peaks of the intensity v. total dispersion characteristic curve, as illustrated, for example, in FIGS. 1 and 2.

FIGS. 11 to 14 are graphs illustrating, as simulation results, the relationship between the 40 GHz component and the eye opening plotted against the amount of total dispersion (after dispersion compensation) when the transmitting optical power is 0, +5, +10, and +13 dBm, respectively, in a 50 km SMF transmission of a 40 Gb/s OTDM signal.

As can be seen from FIG. 1 and FIGS. 11 to 14, the amount of total dispersion at which the intensity of the 40 GHz component is at a minimum coincides with the amount of total dispersion at which the eye opening is the largest only in the case of a linear transmission with a small signal light power (−5 dBm). As the signal light power increases, the nonlinear effect becomes larger and the displacement between the two increases, so that it is difficult to optimize the dispersion compensation amount using the above control method.

Figure 15:
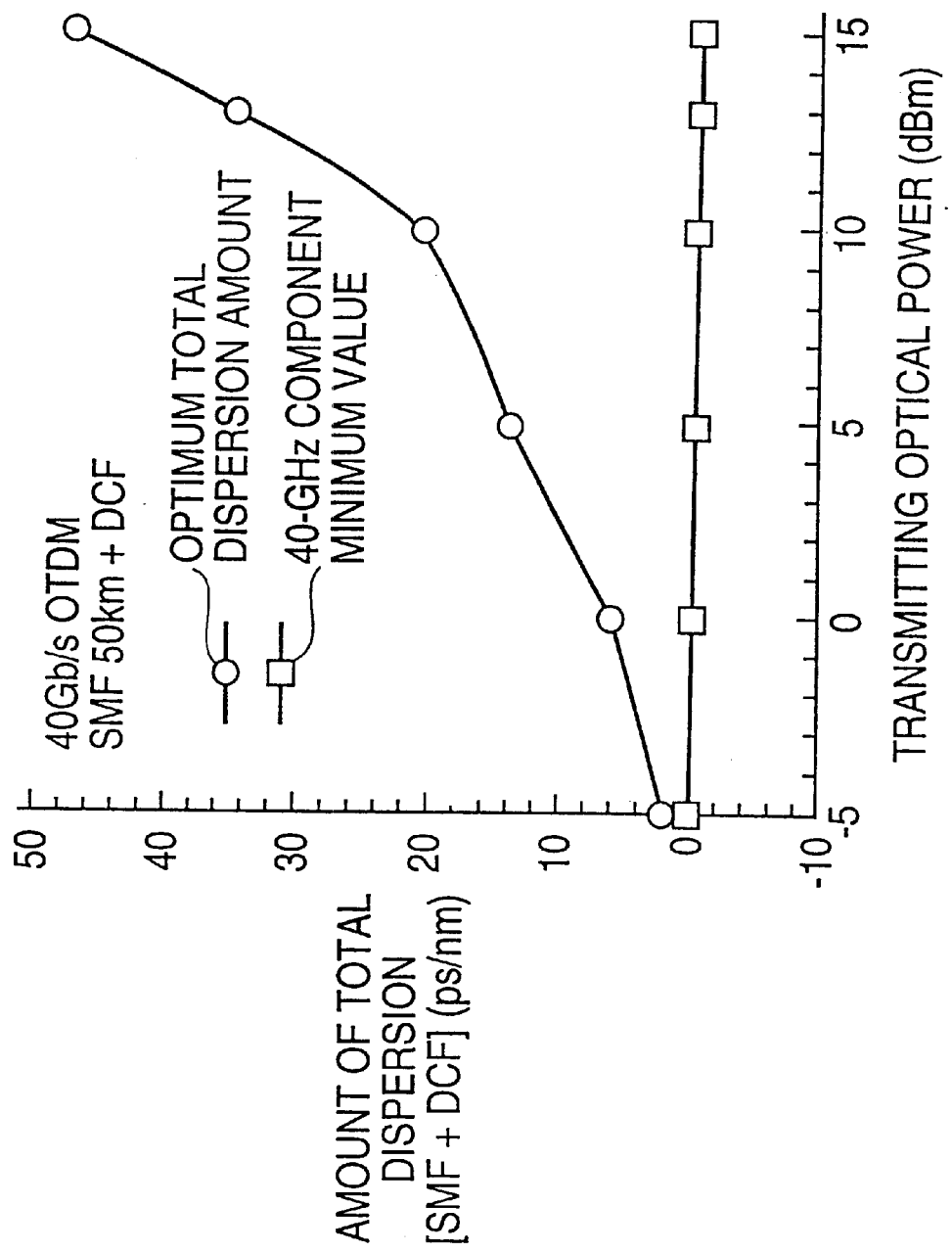
FIG. 15 is a graph illustrating the dependence on signal light power of (a) the optimum amount of total dispersion and (b) the amount of total dispersion at which a 40 GHz component is at a minimum, in the transmission of a 40 GHz OTDM signal, according to an embodiment of the present invention.

FIG. 15 is a graph illustrating the amount of total dispersion at which the eye opening is the largest and the amount of total dispersion at which the 40 GHz component is at a minimum, as a function of the transmitting optical power in the 50 km SMF transmission of the 40 Gb/s OTDM signal. As shown in FIG. 15, the amount of total dispersion at which the 40 GHz component is at a minimum is not dependent on the transmitting optical power, but is kept constant at 0 ps/nm, whereas the amount of total dispersion at which the eye opening is the largest increases in the positive dispersion side as the transmitting optical power increases.

Figure 16:
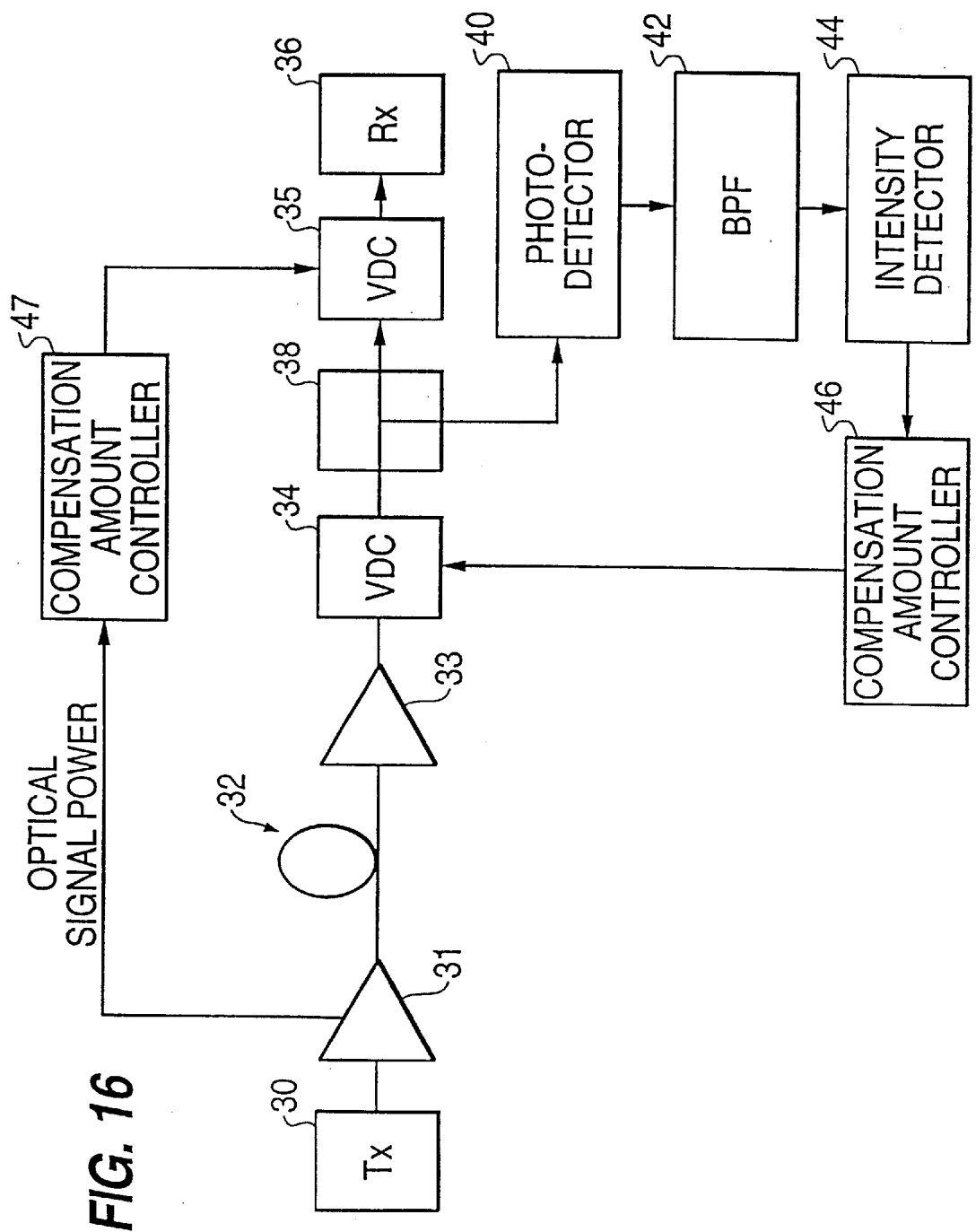
FIG. 16 is a diagram illustrating an automatic dispersion equalization system, according to an embodiment of the present invention.
Figure 17:
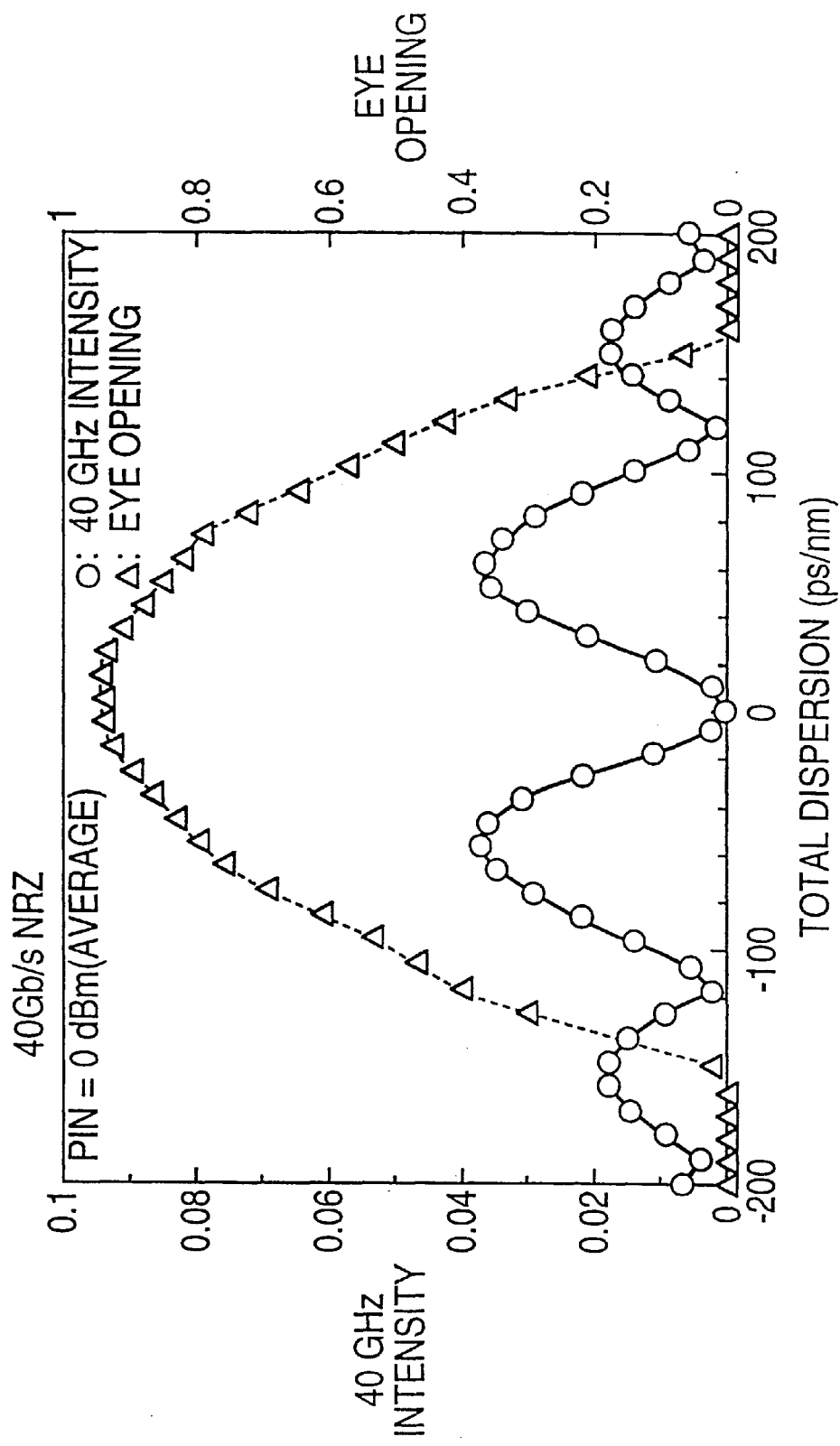
FIG. 17 is a graph illustrating a computer simulation of the dependence of 40 GHz clock component intensity on the amount of total dispersion for a 40 GHz NRZ signal when signal light power is 0 dBm, according to an embodiment of the present invention.
Figure 18:
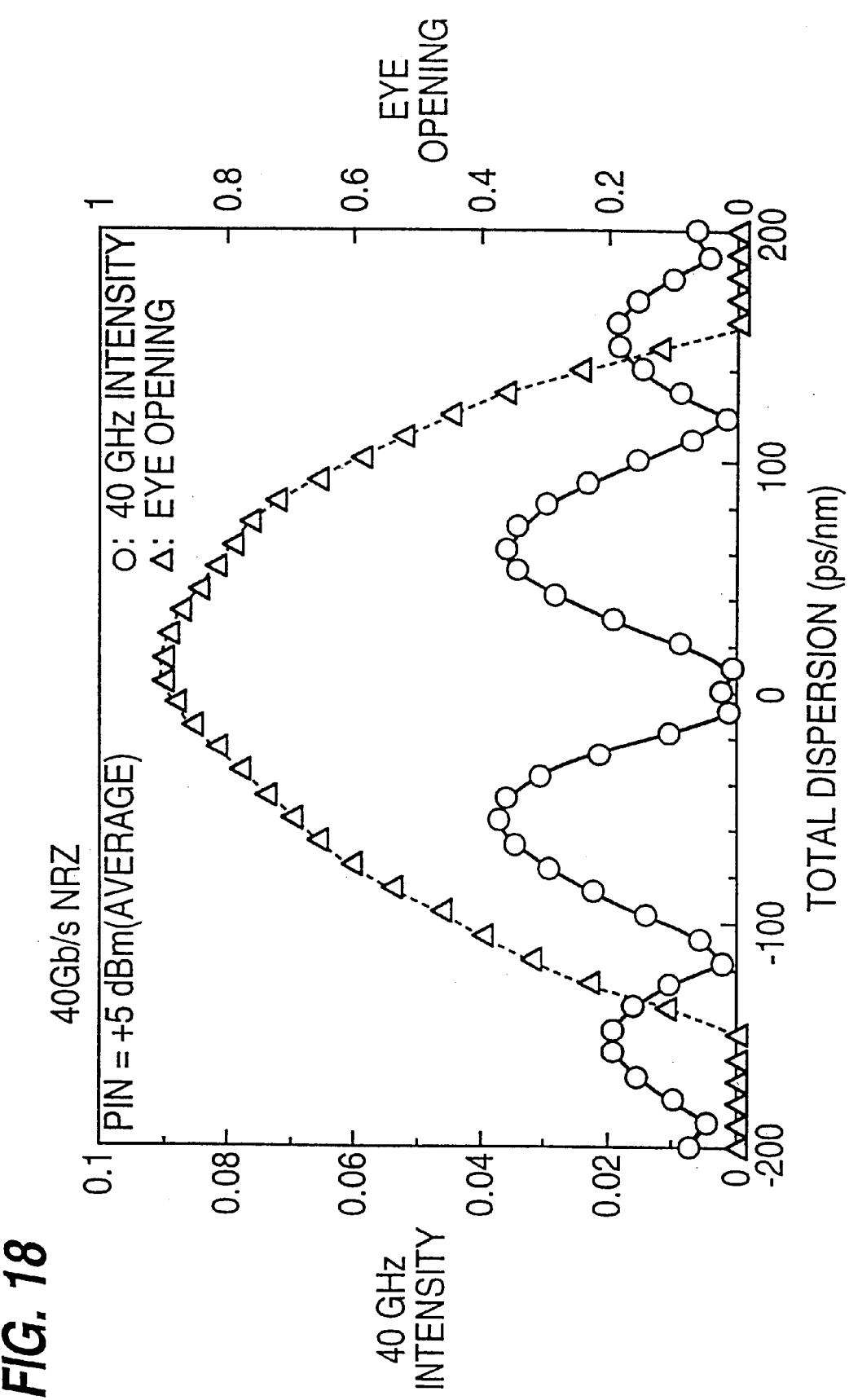
FIG. 18 is a graph illustrating a computer simulation of the dependence of 40 GHz clock component intensity on the amount of total dispersion for a 40 GHz NRZ signal when signal light power is +5 dBm, according to an embodiment of the present invention.
Figure 19:
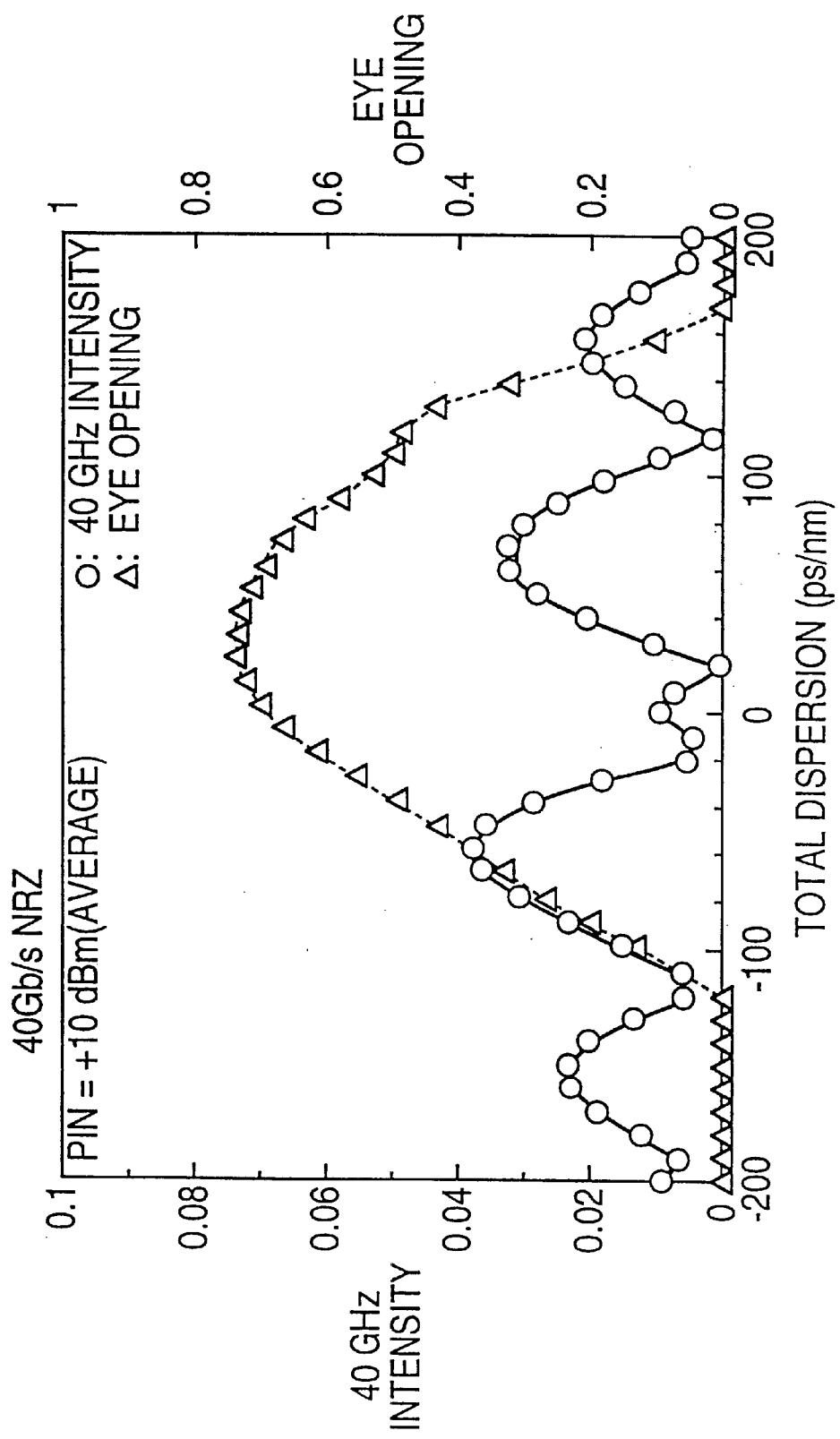
FIG. 19 is a graph illustrating a computer simulation of the dependence of 40 GHz clock component intensity on the amount of total dispersion for a 40 GHz NRZ signal when signal light power is +10 dBm, according to an embodiment of the present invention.
Figure 20:
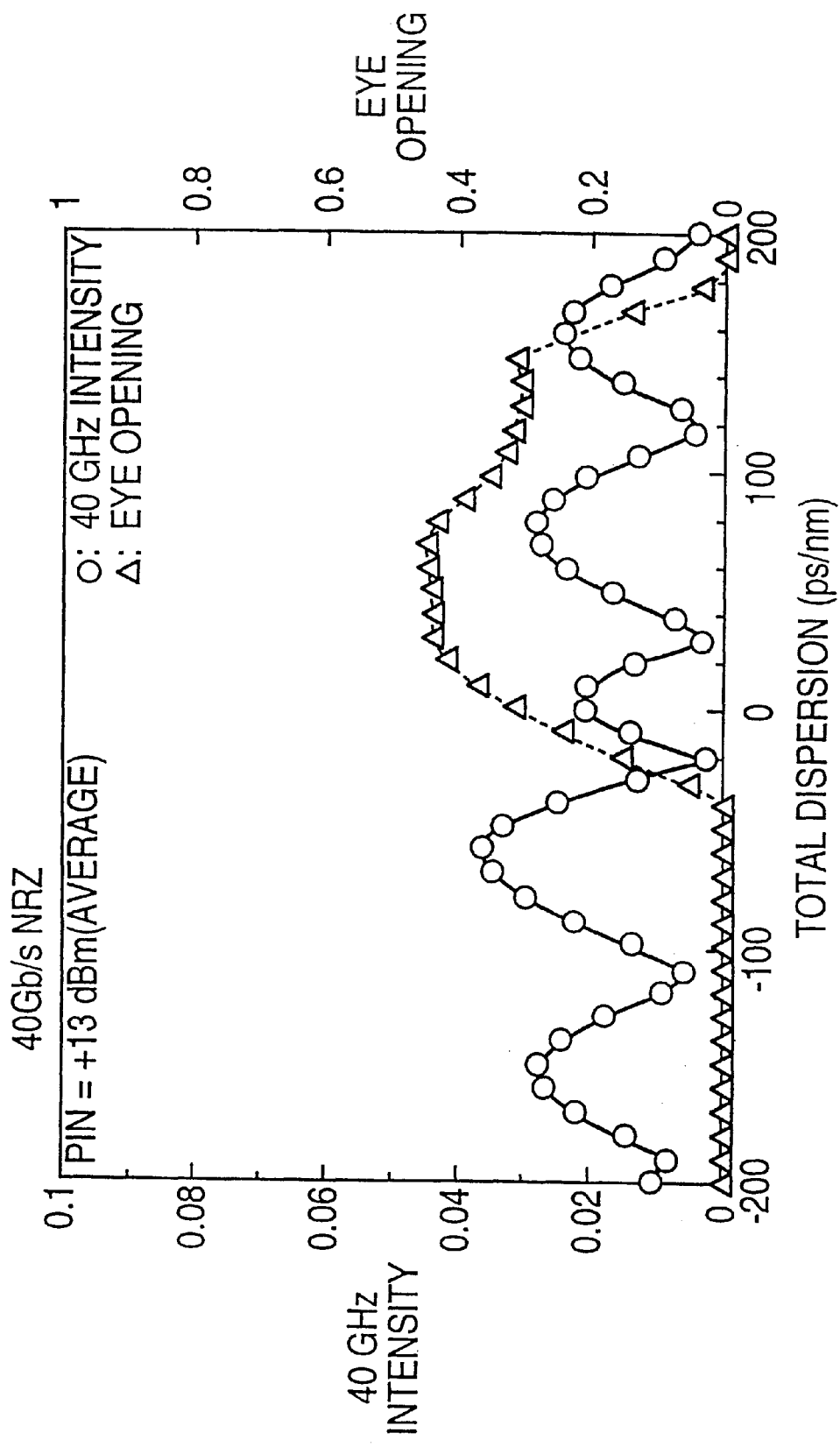
FIG. 20 is a graph illustrating a computer simulation of the dependence of 40 GHz clock component intensity on the amount of total dispersion for a 40 GHz NRZ signal when signal light power is +13 dBm, according to an embodiment of the present invention.

FIG. 16 is a diagram illustrating an automatic dispersion equalization system, according to an embodiment of the present invention. Referring now to FIG. 16, a 40 Gb/s OTDM signal from an optical transmitter 30 is transmitted through an optical transmission line (SMF) 32 and is input into an optical receiver 36 via variable dispersion compensators 34 and 35. A portion of the optical signal input to optical receiver 36 is separated by an optical coupler 38 placed between variable dispersion compensators 34 and 35, and converted by a photodetector 40 into an electrical signal. From the output of photodetector 40, a 40 GHz component is extracted by a band-pass filter 42 whose center frequency is 40 GHz, and the intensity of that component is detected by an intensity detector 44. A compensation amount controller 46 controls the compensation amount in variable dispersion compensator 34 in a direction that brings the 40 GHz component to a maximum for an RZ signal or in a direction that brings the 40 GHz component to a minimum for an OTDM or an NRZ waveform. In the case of an OTDM signal multiplexing two 20 Gb/s RZ signals, the 20 GHz component may be brought to a maximum instead of bringing the 40 GHz component to a minimum.

A compensation amount controller 47 detects optical signal power by using an optical output power monitor signal or a control signal for automatic level control (ALC) usually residing in an optical post-amplifier 31 at the transmitting end, and in the case of an OTDM signal, determines the amount of shift caused by the nonlinear effect by referring to the relationship shown in FIG. 15, and sets it in variable dispersion compensator 35. By so doing, an optimum dispersion amount appropriate to the optical power at that time is added to the optical signal controlled to zero dispersion by variable dispersion compensator 34, before the optical signal is input to optical receiver 36. For detection of the optical signal power, a portion of the output of optical post-amplifier 31 may be separated for detection by a photodiode.

Therefore, according to embodiments of the present invention as illustrated, for example, in FIG. 16, the present invention relates to a method and apparatus which (a) determine an optimum amount of total dispersion of an optical transmission line corresponding to a power level of an optical signal transmitted through the optical transmission line; (b) control dispersion of the optical transmission line so that the total dispersion up to a specific point along the optical transmission line becomes approximately zero; and (c) add dispersion to the optical transmission line to obtain the determined optimum amount of total dispersion. When adding dispersion, the dispersion can be added to the optical transmission line at a point which is downstream of the specific point.

FIGS. 17 to 20 are graphs illustrating, for an NRZ signal, as simulation results, the relationship between the 40 GHz component and the eye opening plotted against the amount of total dispersion (after dispersion compensation) when the transmitting optical power is 0, +5, +10, and +13, respectively, in a 50 km SMF transmission of a 40 Gb/s NRZ signal. As can be seen from FIG. 2 and FIGS. 17 to 20, the amount of total dispersion at which the eye opening is the largest increases in the positive dispersion side as the transmitting optical power increases. This characteristic is the same as that for the OTDM signal.

However, the way that the intensity of the 40 GHz component changes relative to the amount of total dispersion is different from the case of the OTDM signal. More specifically, in the OTDM signal, the 40 GHz component is always at a minimum when the amount of total dispersion is zero, regardless of the transmitting optical power. On the other hand, in the NRZ signal, the 40 GHz component is at a minimum (=0) when the amount of total dispersion is zero in the case of a linear transmission, but the 40 GHz component at zero total dispersion increases as the transmitting optical power increases. As a result, unlike the case of the OTDM signal, variable dispersion compensator 34 cannot be controlled in such a manner as to bring the 40 GHz component to a minimum at zero total dispersion. However, in the case of the 40 Gb/s NRZ signal, since maxima are reached at +60 ps/nm and −60 ps/nm regardless of the transmitting power, variable dispersion compensator 34 can be controlled to bring the amount of total dispersion to zero by determining the midpoint between the two maxima. Variable dispersion compensator 35, on the other hand, is controlled in accordance with the transmitting optical power in the same manner as for the OTDM signal.

Figure 21:
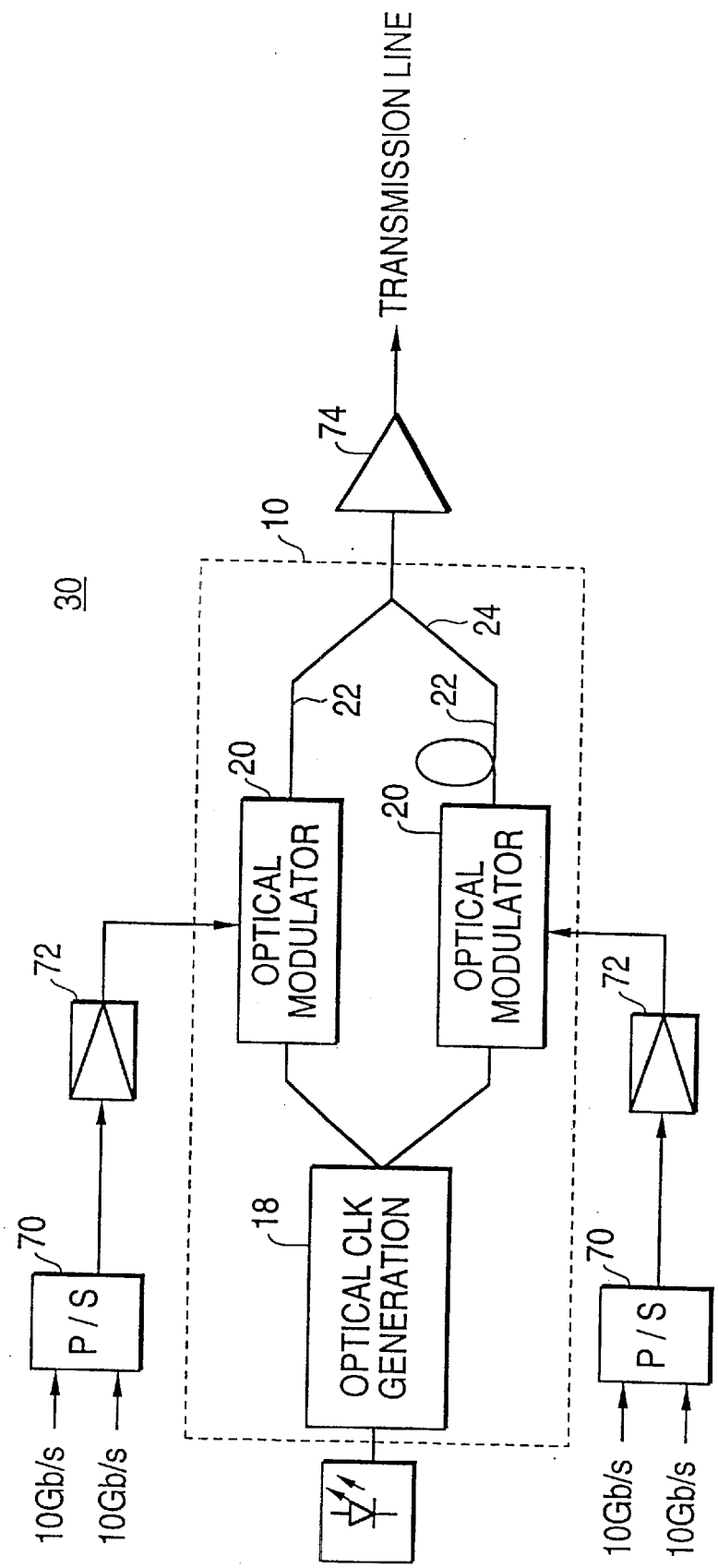
FIG. 21 is a diagram illustrating an optical transmitter of the automatic dispersion equalization system of FIG. 16, according to an embodiment of the present invention.
Figure 22:
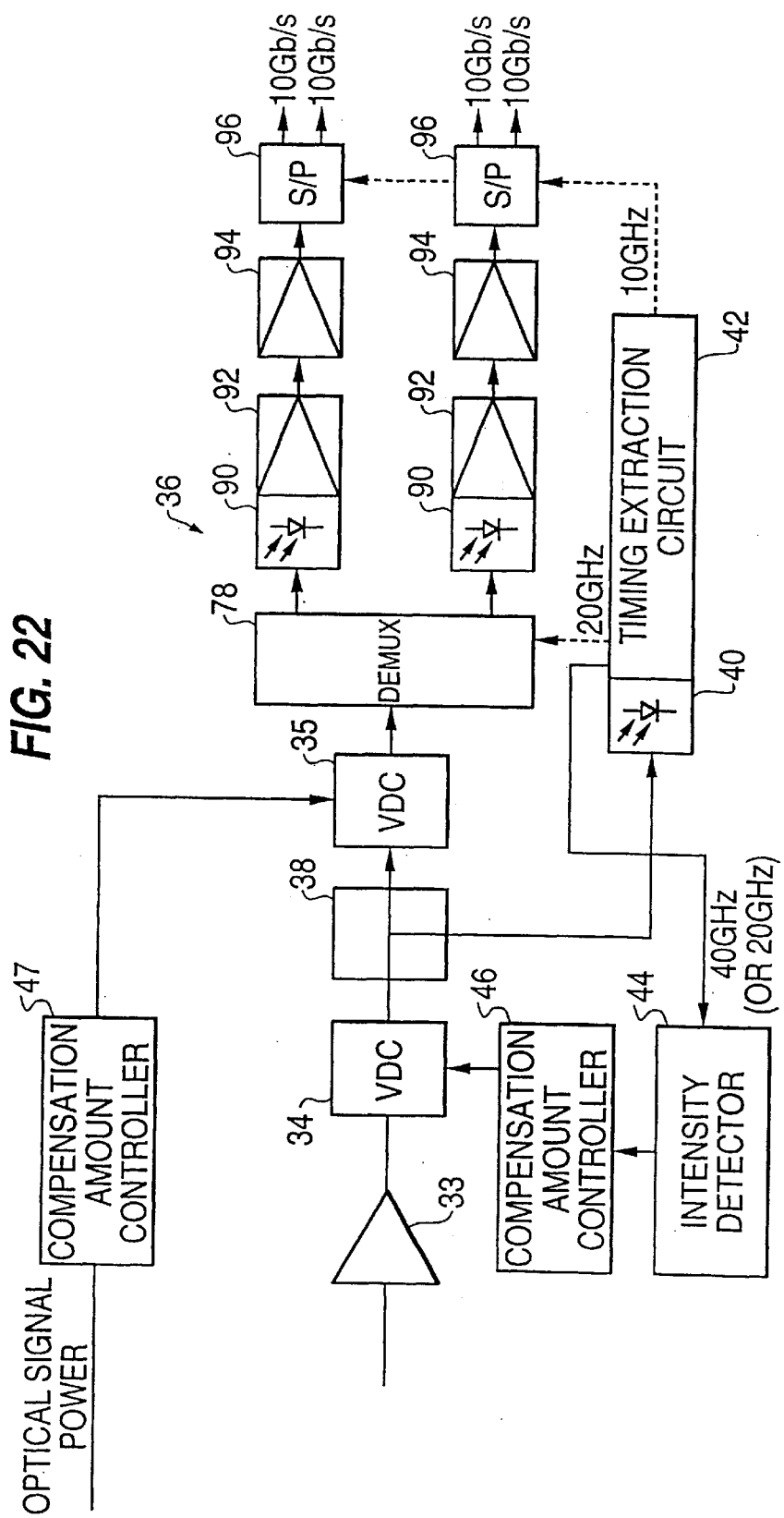
FIG. 22 is a diagram illustrating an optical receiver of the automatic dispersion equalization system in FIG. 16, according to an embodiment of the present invention.

Specific examples of optical transmitter 30 and optical receiver 36 of FIG. 16 are shown in FIGS. 21 and 22, respectively. In optical transmitter 30 of FIG. 21, OTDM modulator 10 shown in FIG. 5 is used as the optical modulator for generating an optical signal. In FIG. 21, OTDM modulator 10 of FIG. 5 is functionally illustrated using the same reference numerals designating the same elements as those shown in FIG. 5.

Figure 23:
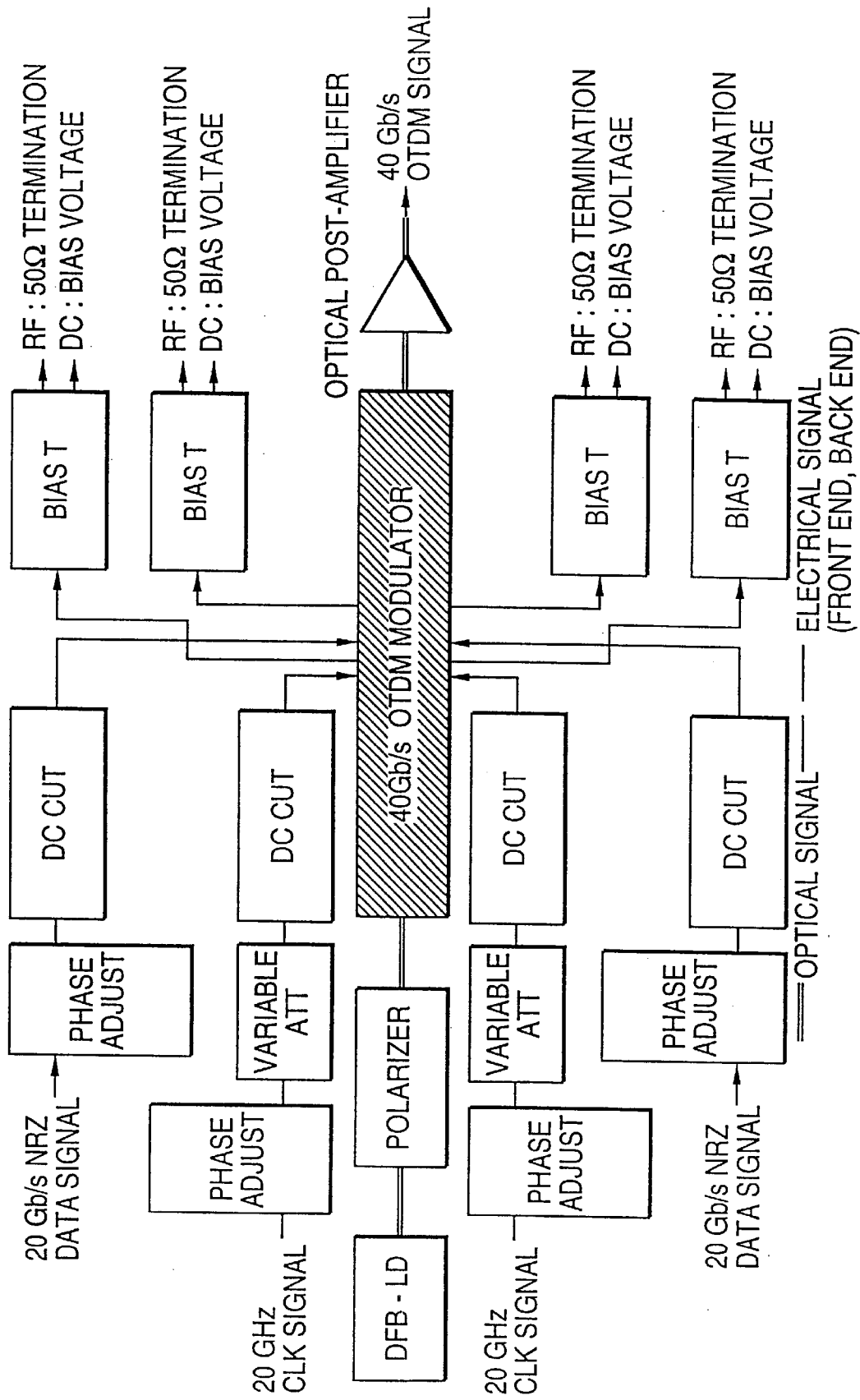
FIG. 23 is a diagram illustrating an optical transmitter, according to an embodiment of the present invention.

In FIG. 21, two 10 Gb/s data signals input in parallel are converted by a parallel/serial converter 70 to obtain one 20 Gb/s NRZ signal. This 20 Gb/s NRZ signal is input to a driver 72 to obtain a 20 Gb/s drive signal for driving an optical modulator 20. The output (20 Gb/s RZ optical signal) of each optical modulator 20 is phase-adjusted by a phase adjuster 22 (the phase is shifted so that the phase difference of the light becomes 180°), after which the thus adjusted signals are combined together by an optical multiplexer 24 (optical coupler) to obtain a 40 Gb/s optical signal of NRZ format, which is then sent out on a transmission line via an optical post-amplifier 74. A detailed circuit diagram of such an optical transmitter is shown in FIG. 23.

In the optical receiver of FIG. 22, the 40 Gb/s optical signal is input into an optical DEMUX 78 via optical preamplifier 33, variable dispersion compensator 34, beam splitter 38, and variable dispersion compensator 35.

Figure 24:
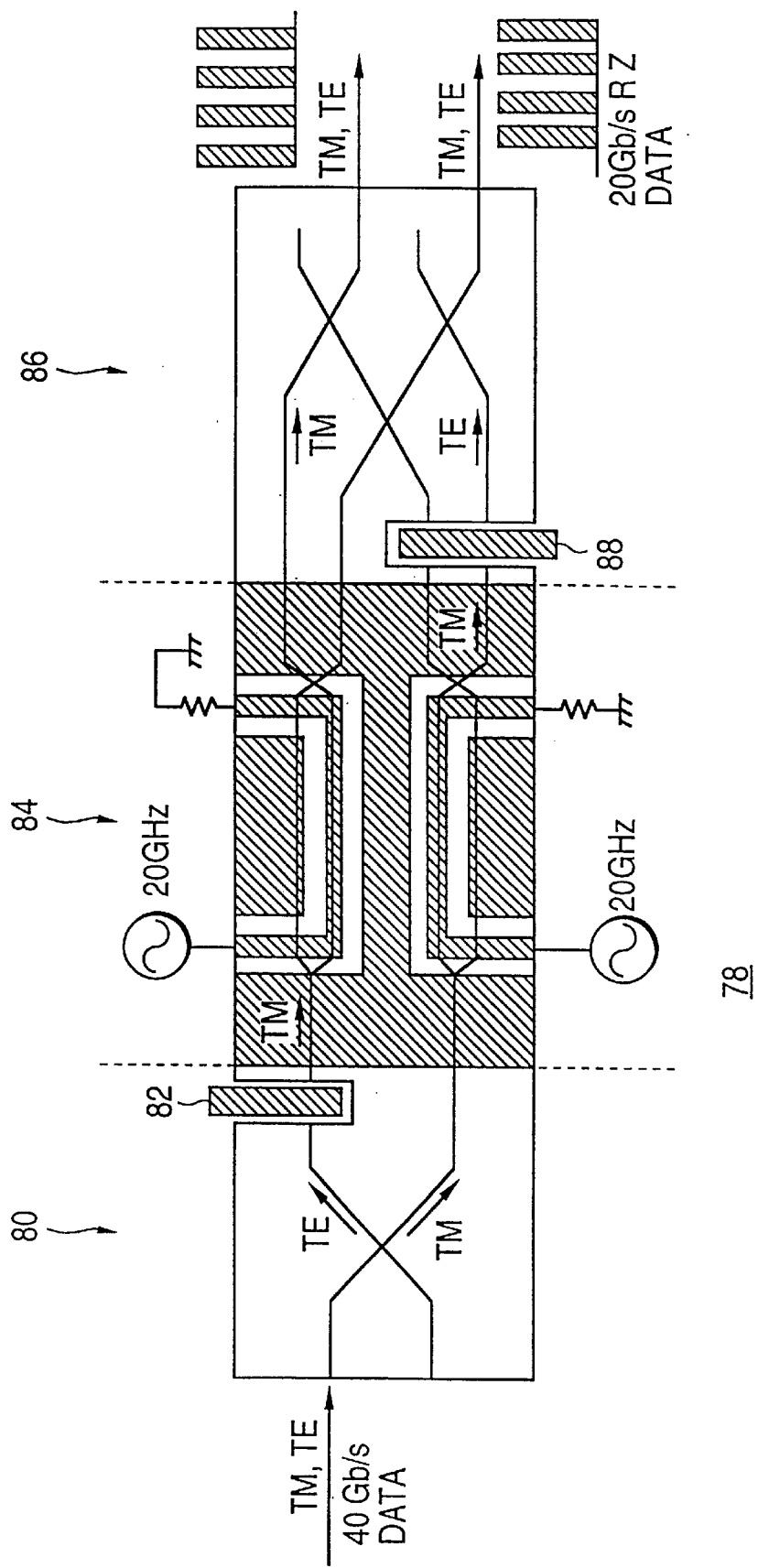
FIG. 24 is a diagram illustrating a polarization-independent demultiplexer (DEMUX), according to an embodiment of the present invention.

FIG. 24 is a diagram illustrating polarization-independent optical DEMUX 78. Polarization independence is preferably used for the optical DEMUX placed at the receiving end. For that purpose, the 40 Gb/s OTDM signal input after transmission through the fiber is first split, according to polarization, into TE and TM components by a crossed-waveguide polarization splitter 80 at the first stage. Here, crossing length is optimized so that a polarization extinction ratio of 20 dB or more can be obtained. Next, using a 1×2 switch 84 which is driven by a 20 GHz sinusoidal signal, each mode is optical time-division demultiplexed into 20 Gb/s optical RZ signals. At this time, the two outputs of each 1×2 switch are in a complementary relationship to each other. However, generally, in an LN switch (modulator), modulation efficiency is greater for the TM mode than for the TE mode. Therefore, in the illustrated device, the TE mode light after polarization splitting is converted by a half-wave plate 82 into TM mode light which is then subjected to optical demultiplexing. At the final stage, the same bit sequences are combined together using two polarization beam combiners. Here, if the beams of the same TM mode were combined together, beam interference would occur, as in the case of the previously described OTDM modulator. Therefore, 1×2 switch 84 where the TE/TM mode conversion is not performed is followed by a half-wave plate 88 which performs TM/TE mode conversion, and thereafter, the powers of the cross polarization components are combined.

Figure 25:
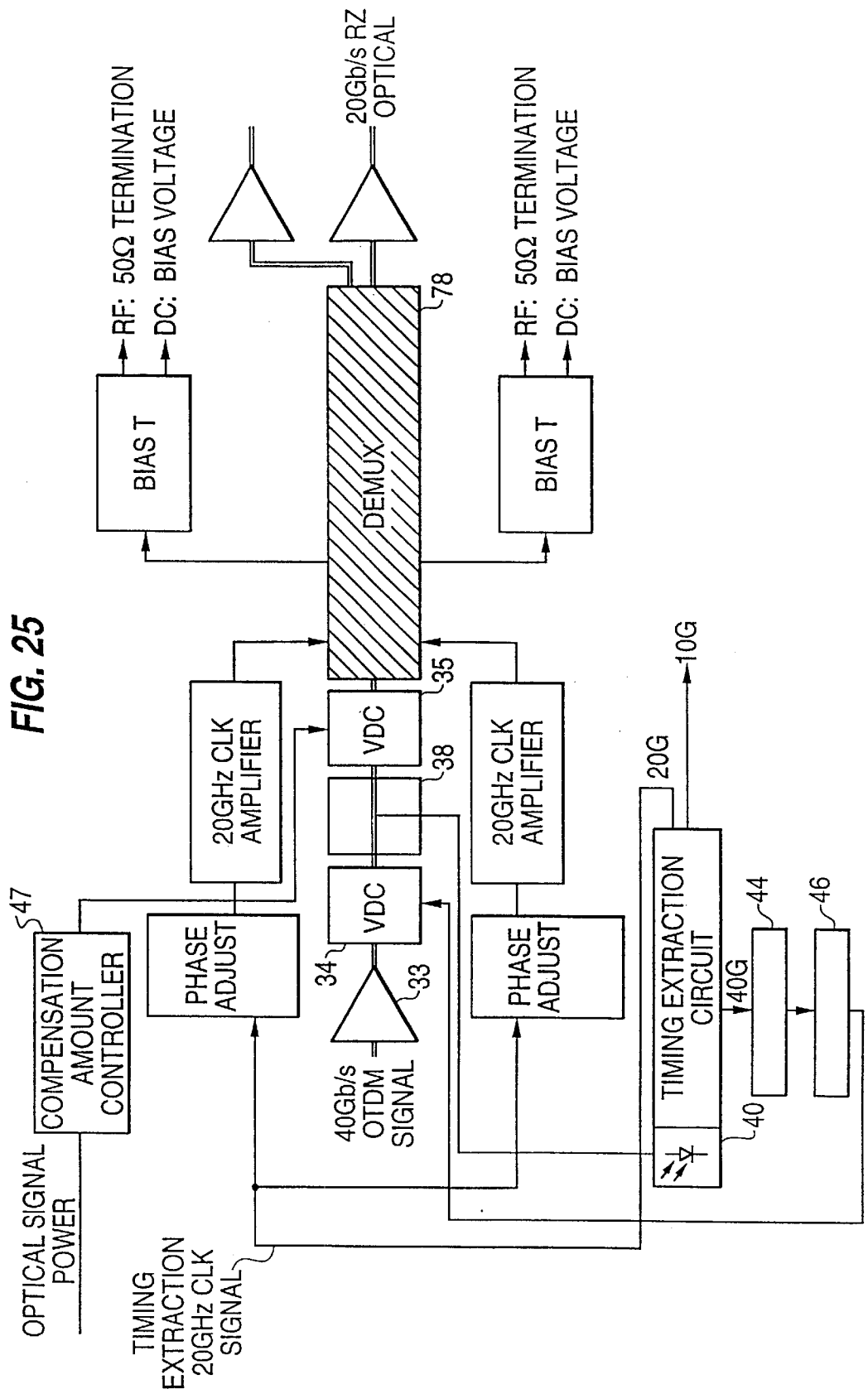
FIG. 25 is a detailed circuit diagram of a portion of an optical receiver, according to an embodiment of the present invention.

Referring again to FIG. 22, the two 20 Gb/s optical RZ signals obtained from optical DEMUX 78 are each input to a photodiode 90 for conversion into an electrical signal, which is then amplified by a preamplifier 92 and waveshaped by an equalizing amplifier 94. The waveshaped signal is then reconstructed by a serial/parallel converter 96 into the original 10 Gb/s NRZ signal. After that, the data is reproduced by a 10 Gb/s discriminator (not illustrated). A detailed circuit diagram of optical receiver 36, up to the optical demultiplexing section, is illustrated in FIG. 25.

Next, an example of variable dispersion compensators 34 and 35 will be described. See, M. M. Ohn et al., "Tunable fiber grating dispersion using a piezoelectric stack, OFC '97 Technical Digest, WJ3, pp. 155–156, which is incorporated herein by reference.

Figure 26:
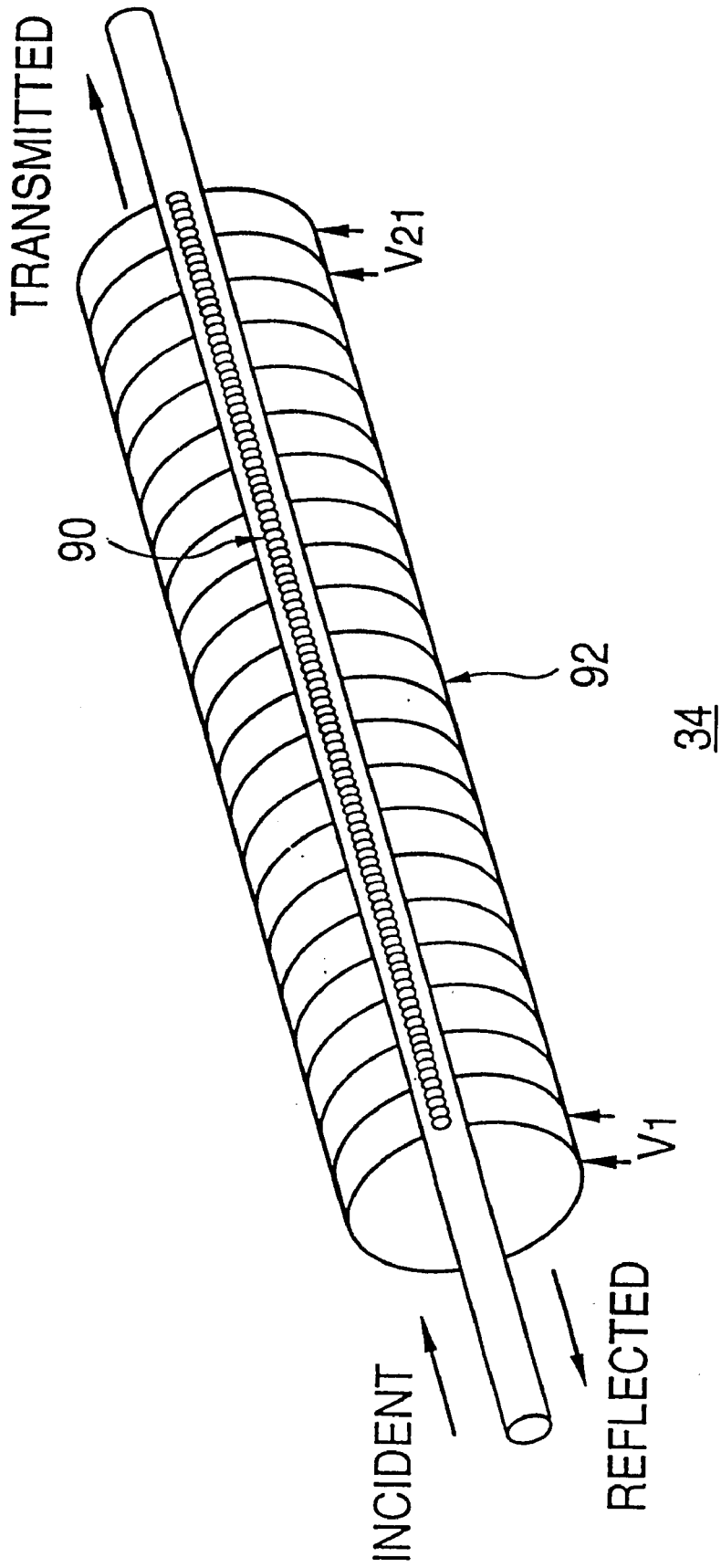
FIG. 26 is a diagram illustrating a variable dispersion compensator, according to an embodiment of the present invention.
Figure 27:
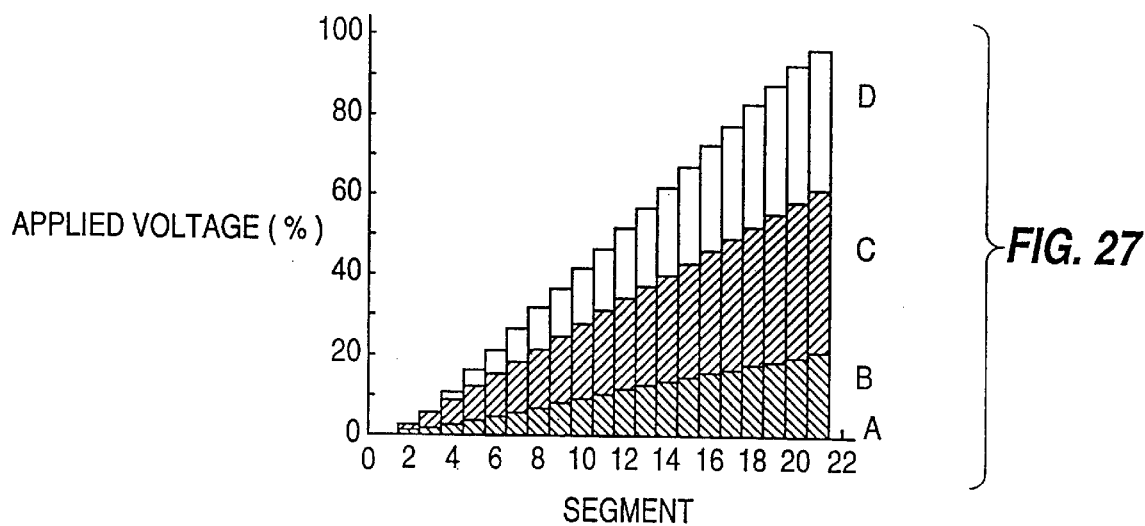
FIG. 27 is a graph illustrating patterns A to D of voltages $V_1$, to $V_{21}$ applied to segments of the variable dispersion compensator of FIG. 26, according to an embodiment of the present invention.
Figure 28:
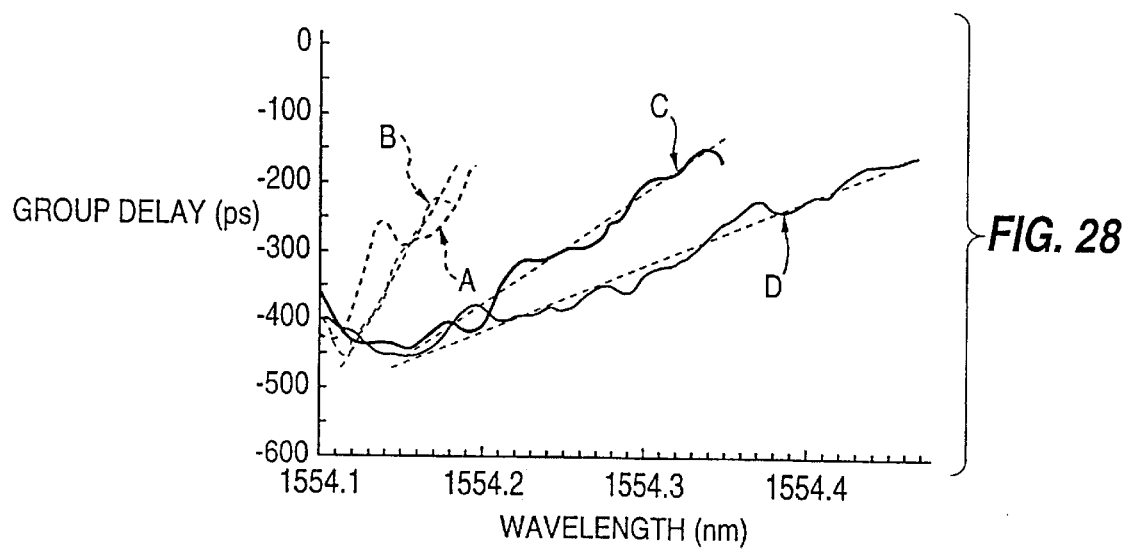
FIG. 28 is a graph illustrating dispersion values for the voltage patterns A to D in FIG. 27, according to an embodiment of the present invention.

More specifically, FIG. 26 is a diagram illustrating a variable dispersion compensator, such as either variable dispersion compensator 34 or 35, according to an embodiment of the present invention. FIG. 27 is a graph illustrating patterns A to D of voltages $V_1$ to $V_{21}$ applied to segments of the variable dispersion compensator of FIG. 26, according to an embodiment of the present invention. FIG. 28 is a graph illustrating dispersion values for the voltage patterns A to D in FIG. 27, according to an embodiment of the present invention.

As shown in FIG. 26, a piezoelectric element 92 is attached to each of twenty-one segments of a chirped fiber grating 90. When voltages $V_1$ to $V_{21}$, with a gradient as shown in FIG. 27, are applied to the piezoelectric elements, the pressure being applied in the longitudinal direction of grating 90 changes, and for the voltage patterns A to D shown in FIG. 27, the dispersion values (slopes of the lines) change as shown in FIG. 28. Here, by applying voltage patterns intermediate between the voltage patterns A to D, the dispersion values can be changed continuously.

Figure 29:
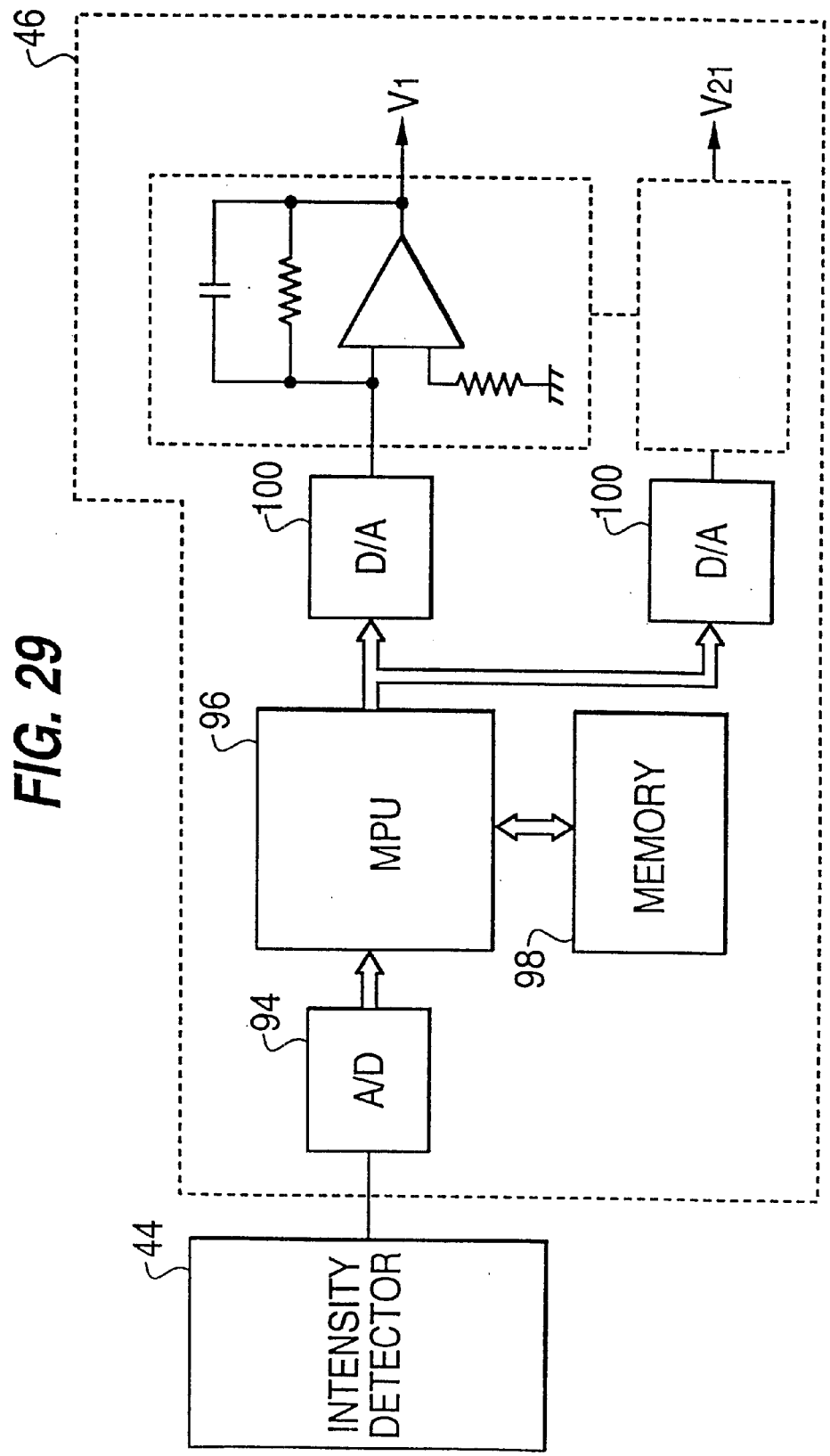
FIG. 29 is a diagram illustrating a compensation amount controller, according to an embodiment of the present invention.

FIG. 29 is a diagram illustrating an example of compensation amount controller 46, according to an embodiment of the present invention. Referring now to FIG. 29, the intensity value of the 40 Gb/s frequency component is A/D converted by an A/D converter 94 and input as a digital signal to an MPU 96. MPU 96 compares the present intensity value Ic with the previously received intensity value Ip stored in a memory 98, and checks to determine whether the relationship between the present dispersion amount and the intensity of the 40 Gb/s is on the X slope or Y slope in FIG. 2. That is, when it is on the X slope, the amount of dispersion will tend to zero (Z point) if the dispersion amount of variable dispersion compensator 34 is reduced. When it is on the Y slope, the amount of dispersion will tend to zero if the dispersion amount of variable dispersion compensator 34 is increased. Therefore, when Ic>Ip, it is assumed that the relationship is on the X slope, and to control the voltages applied to variable dispersion compensator 34, such values of $V_1$ to $V_{21}$ that cause the dispersion amount to decrease are obtained, and the voltages to be applied to the respective piezoelectric elements are each output via a D/A converter 100 having a latch.

Conversely, when Ic ( Ip, it is assumed that the relationship is on the Y slope, and such values of $V_1$ to $V_{21}$ that cause the dispersion amount to increase are obtained to control the voltages applied to variable dispersion compensator 34.

Here, to obtain the values of $V_1$ to $V_{21}$, the data shown in FIGS. 27 and 28 (the data representing the relationship between the dispersion amount and the $V_1$ to $V_{21}$) and the data shown in FIG. 2 (the data representing the relationship between the intensity of the 40 GHz component and the amount of total dispersion) are stored in memory in advance. Then, it is determined whether the relationship is on the X slope or Y slope in FIG. 2, and the present dispersion amount Ic is obtained from the data shown in FIG. 2. Next, a dispersion amount Ic' necessary for compensation in variable dispersion compensator 34 in order to reduce the amount of dispersion to zero at Z point is determined from the present dispersion amount Ic. That is, Ic' is determined so that Ic+Ic'=0.

Once Ic' is determined in this way, the $V_1$ to $V_{21}$ to be applied to variable dispersion compensator 34 in order to obtain Ic' are determined based on the data shown in FIGS. 27 and 28.

Referring now to FIG. 16, compensation amount controller 47 holds therein the data concerning the relationship between the optical signal and optimum total dispersion amount shown in FIG. 15 as well as the relationship between the voltage patterns to be applied to the variable dispersion compensator and the dispersion values. From the value of the optical signal power at the output of optical post-amplifier 31, compensation amount controller 47 first determines the value of the optimum total dispersion amount at that time and then determines the corresponding voltages $V_1$ to $V_{21}$ which are applied to variable dispersion compensator 35.

Figure 30:
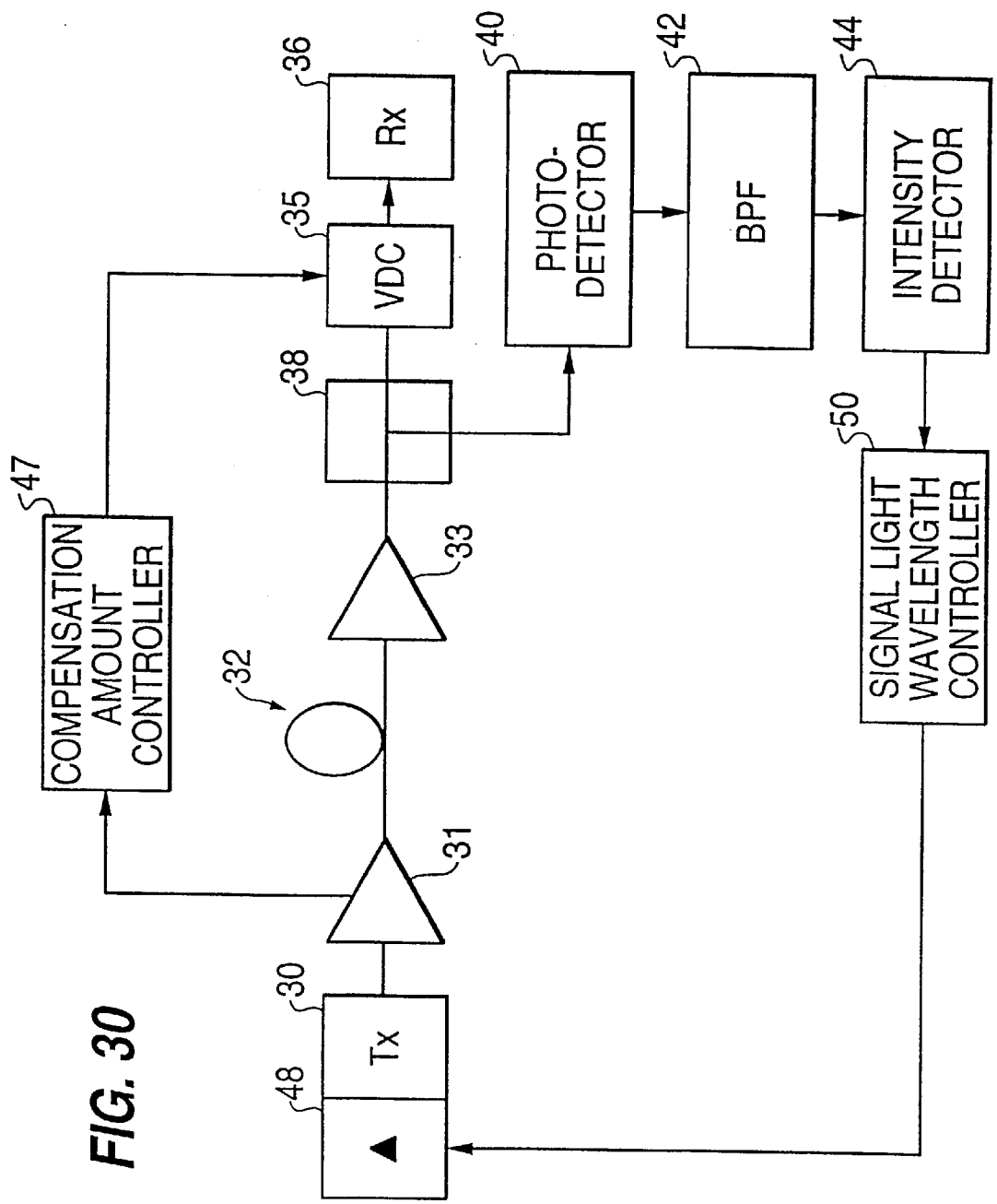
FIG. 30 is a diagram illustrating a modification of the automatic dispersion equalization system of FIG. 16, according to an embodiment of the present invention.

FIG. 30 is a diagram illustrating a modification of the automatic dispersion equalization system of FIG. 16, according to an embodiment of the present invention. Referring now to FIG. 30, variable dispersion compensator 34 in the system of FIG. 16 is replaced by a variable wavelength light source 48 provided at optical transmitter 30, and the amount of chromatic dispersion of optical transmission line 32 is controlled by controlling signal light wavelength through a signal light wavelength controller 50.

Figure 31:
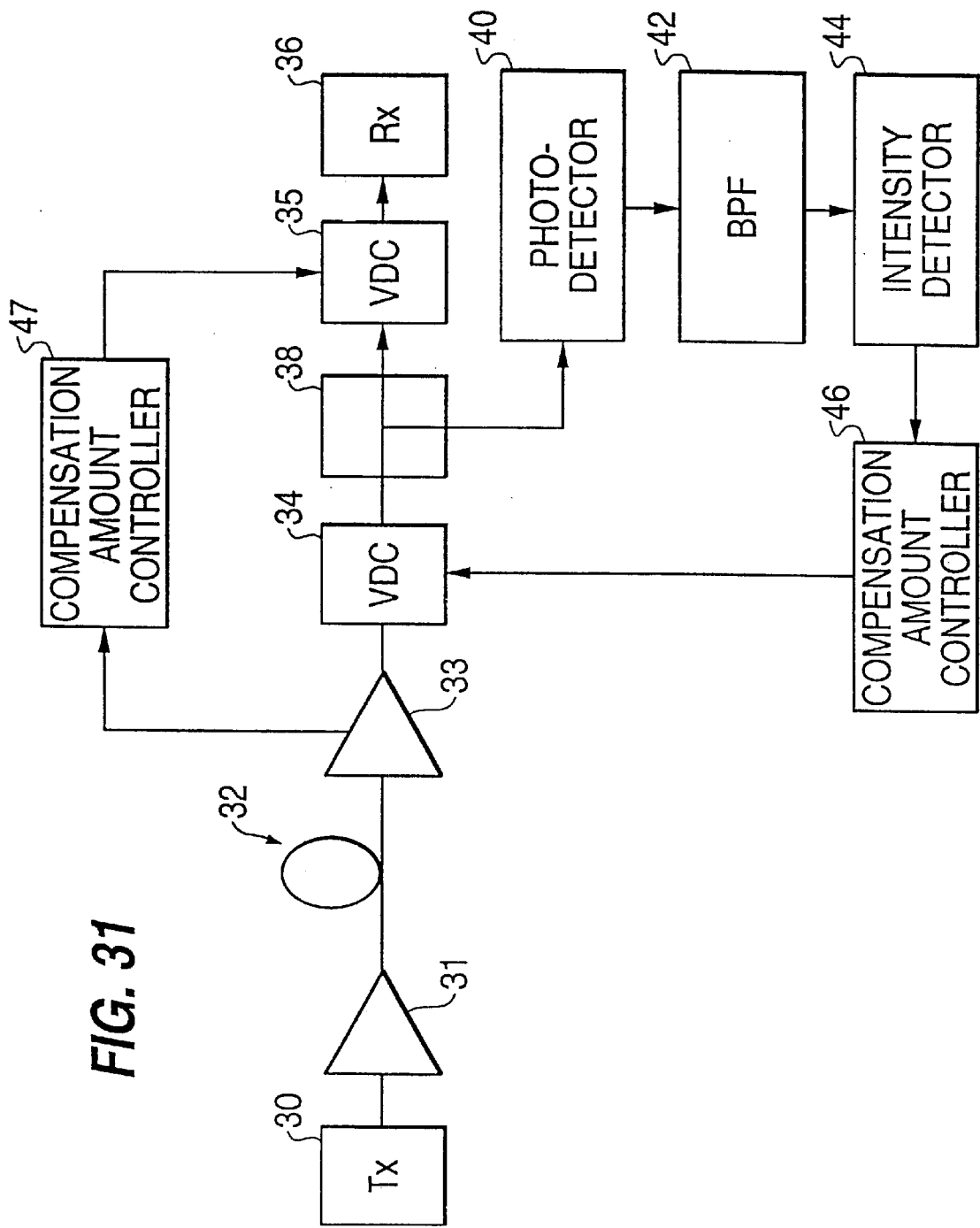
FIG. 31 is a diagram illustrating an additional modification of the automatic dispersion equalization system of FIG. 16, according to an embodiment of the present invention.

FIG. 31 is a diagram illustrating another modification of the automatic dispersion equalization system of FIG. 16, according to an embodiment of the present invention. Referring now to FIG. 31, a control signal or a monitor signal from optical preamplifier 33 at the receiving end, not from optical post-amplifier 31 at the transmitting end, is used as the signal for optical signal power detection. In other respects, the configuration is the same as that of the system shown in FIG. 16. In the system of FIG. 31, instead of controlling variable dispersion compensator 34, signal light wavelength may be controlled using variable wavelength light source 48 as in the system of FIG. 30.

Figure 32:
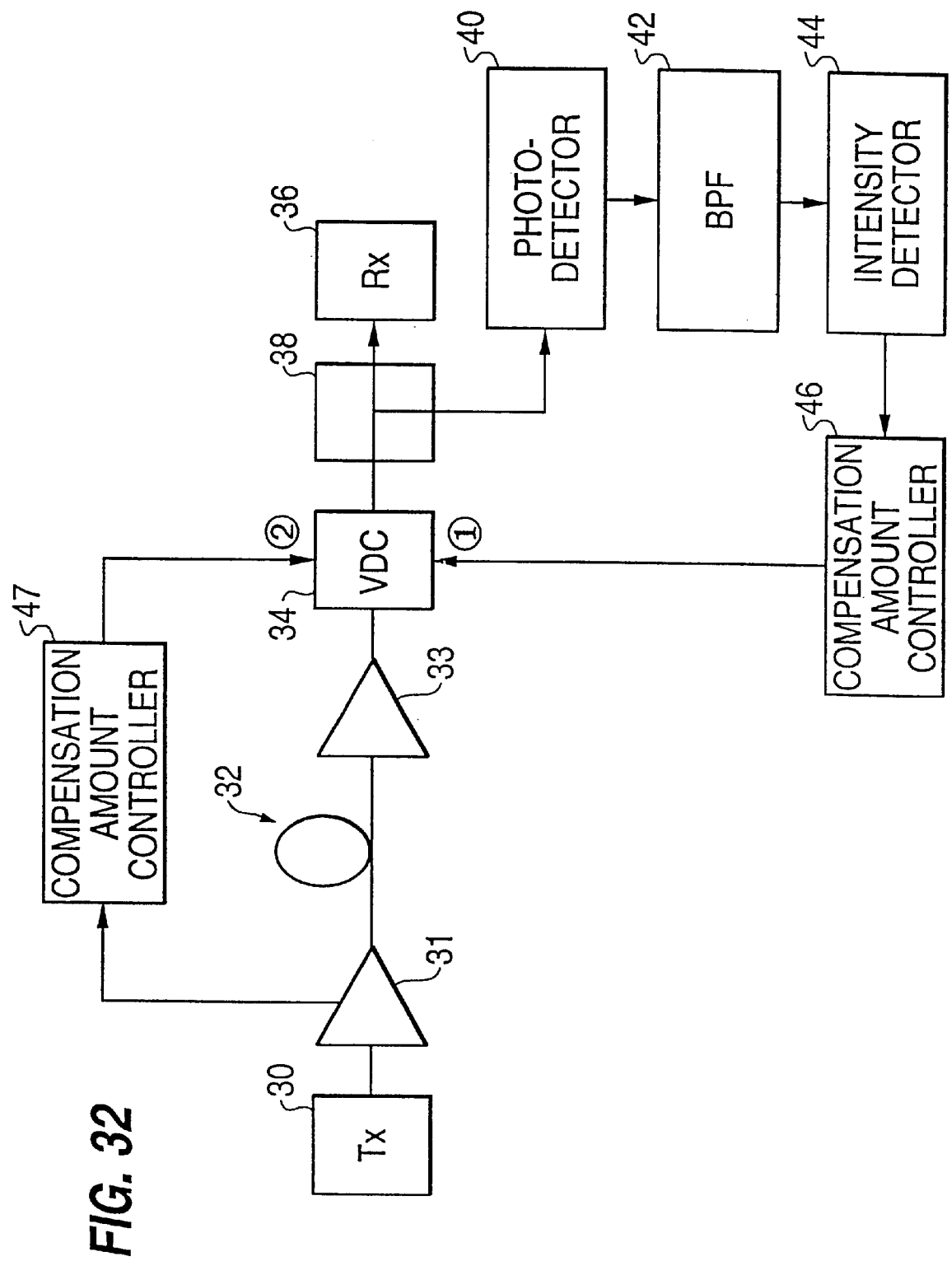
FIG. 32 is a diagram illustrating an automatic dispersion equalization system, according to an embodiment of the present invention.

FIG. 32 is a diagram illustrating an automatic dispersion equalization system, according to an embodiment of the present invention. Referring now to FIG. 32, the signal light power is first set to a sufficiently low value at system startup so that the nonlinear effect does not occur and, in this condition, the amount of total dispersion is controlled to zero through the loop formed by photodetector 40, band-pass filter 42, intensity detector 44, compensation amount controller 46, and variable dispersion compensator 34.

During system operation, compensation amount controller 47 determines, from the magnitude of the optical power, the amount of shift in the optimum dispersion value caused by the nonlinear effect, and varies the dispersion value in variable dispersion compensator 34 by the same amount.

Figure 14:
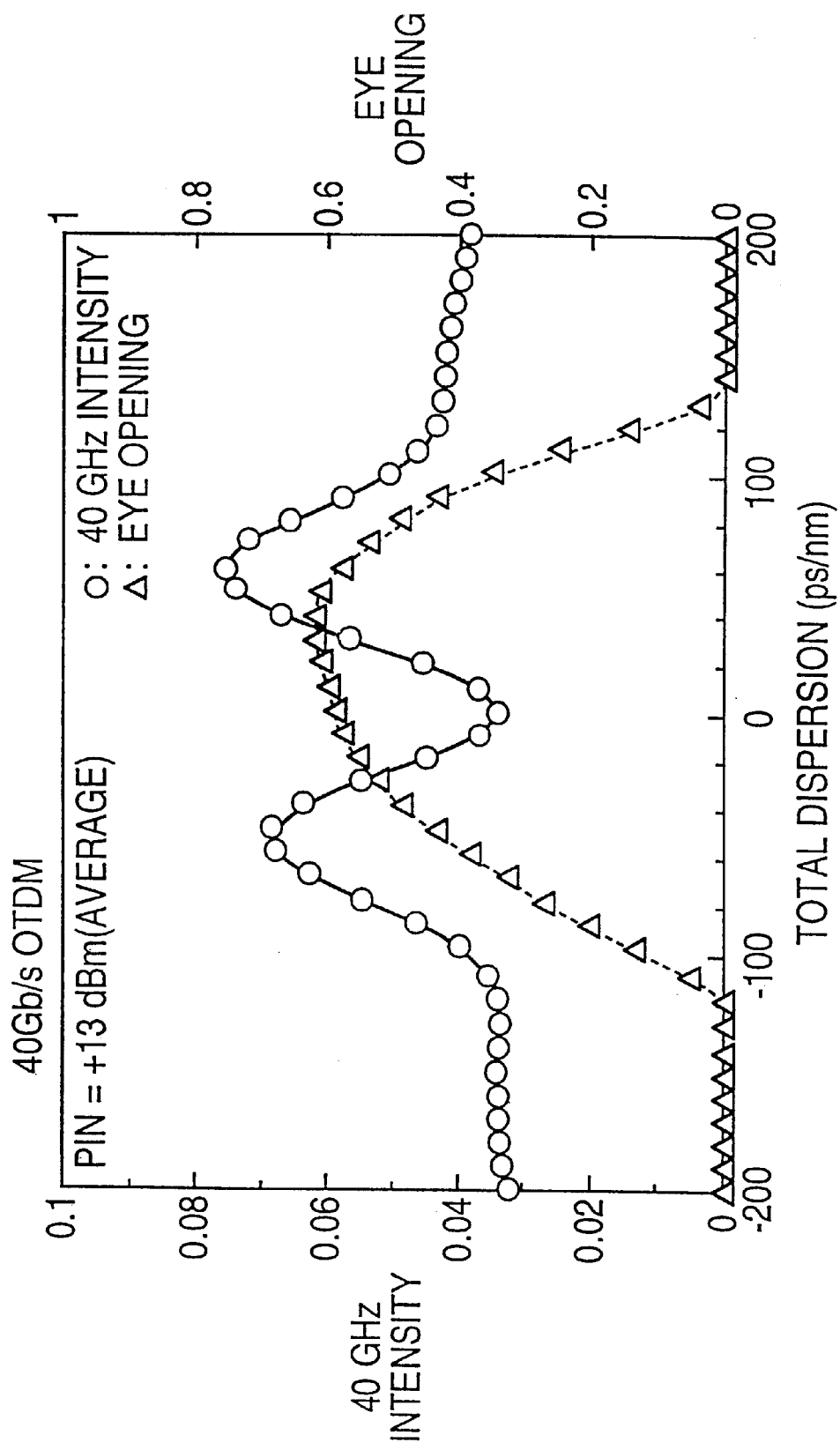
FIG. 14 is a graph illustrating a computer simulation of the dependence of 40 GHz clock component intensity on the amount of total dispersion for the 40 GHz OTDM signal when signal light power is +13 dBm, according to an embodiment of the present invention.
Figure 33:
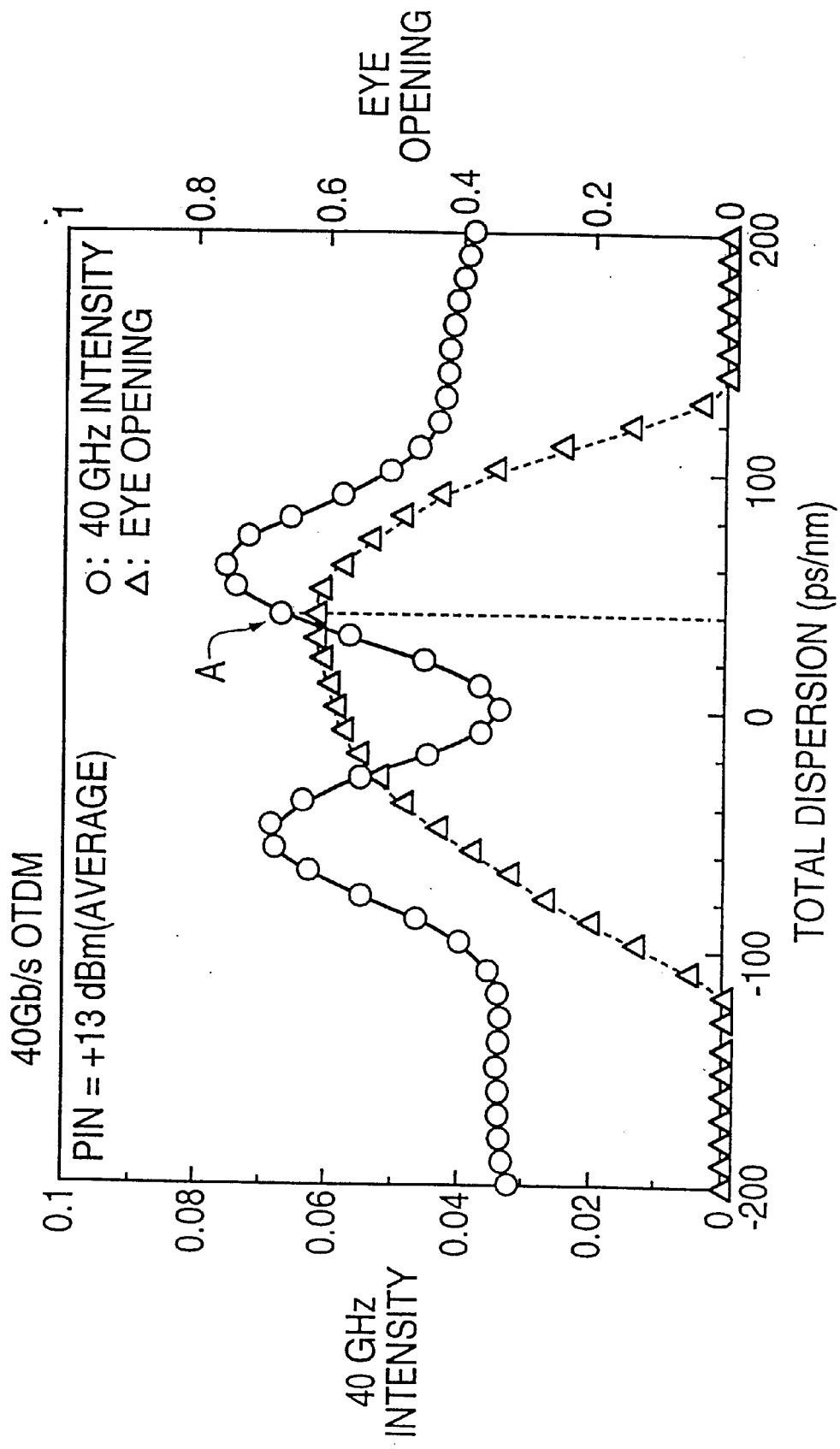
FIG. 33 is a graph for explaining the modification of the automatic dispersion equalization system in FIG. 32, according to an embodiment of the present invention.

FIG. 33 is a graph for explaining the modification of the automatic dispersion equalization system in FIG. 32, according to an embodiment of the present invention. More specifically, the relationship shown in FIG. 14 is redrawn in FIG. 33.

As can be seen from FIG. 33, when the amount of total dispersion is limited to within a certain range, the amount of total dispersion is uniquely determined from the 40 GHz intensity. Therefore, in FIG. 32, after the amount of total dispersion is set to zero at system startup, control may be performed to bring the 40 GHz intensity to a value corresponding to the optimum value in order to set the amount of total dispersion to the optimum value which is determined from the signal light power during system operation. For example, when the signal light power is +13 dBm, the optimum total dispersion amount is 40 ps/nm from the relationship shown in FIG. 15. Therefore, control is performed to bring the 40 GHz intensity to the value at point A in FIG. 33.

Figure 34:
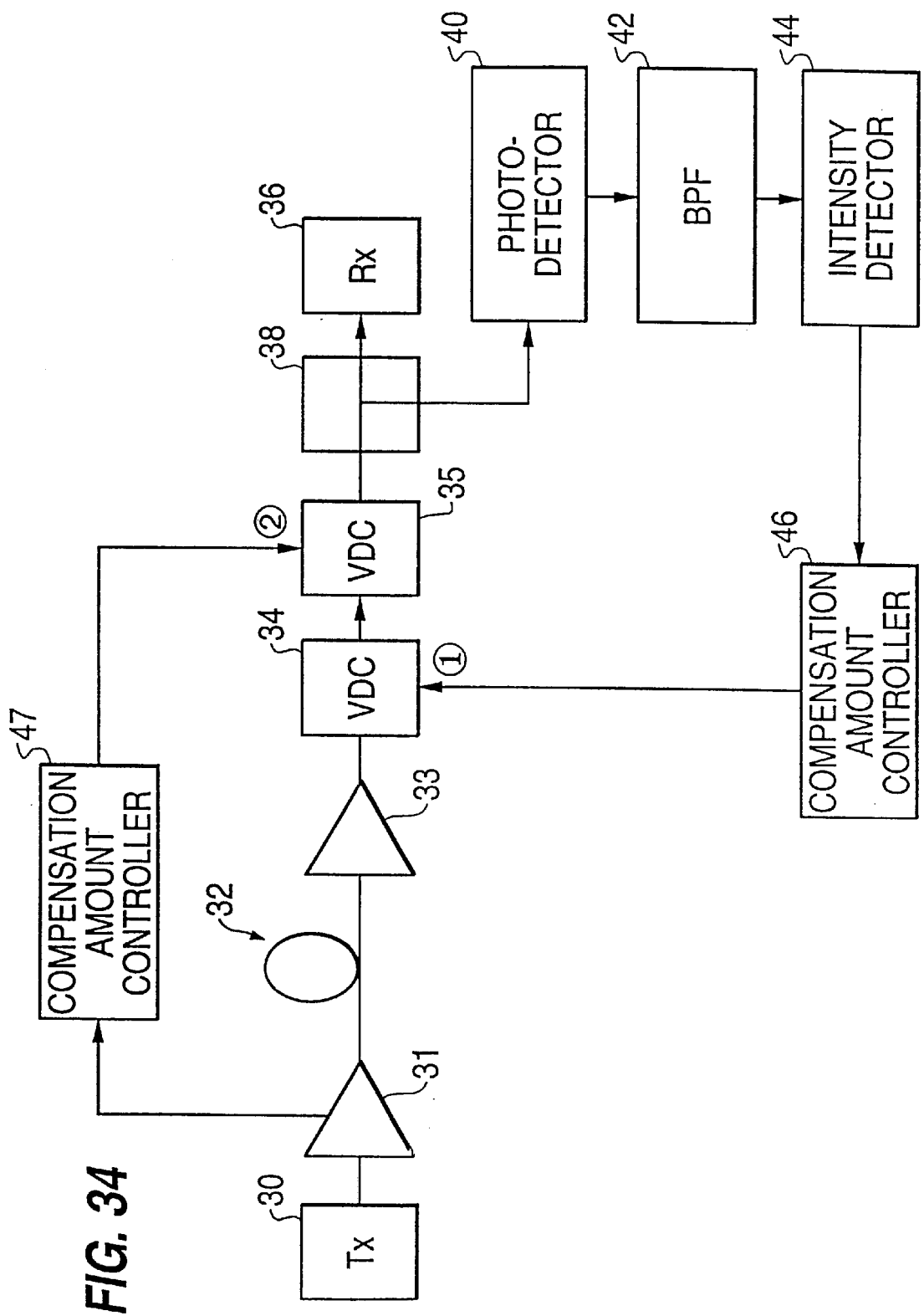
FIG. 34 is a diagram illustrating a modification of the automatic dispersion equalization system of FIG. 32, according to an embodiment of the present invention.

FIG. 34 is a diagram illustrating a modification of the automatic dispersion equalization system of FIG. 32, according to an embodiment of the present invention. Referring now to FIG. 34, control of the dispersion amount at system startup is performed using variable dispersion compensator 34, and control during system operation is performed using variable dispersion compensator 35.

Figure 35:
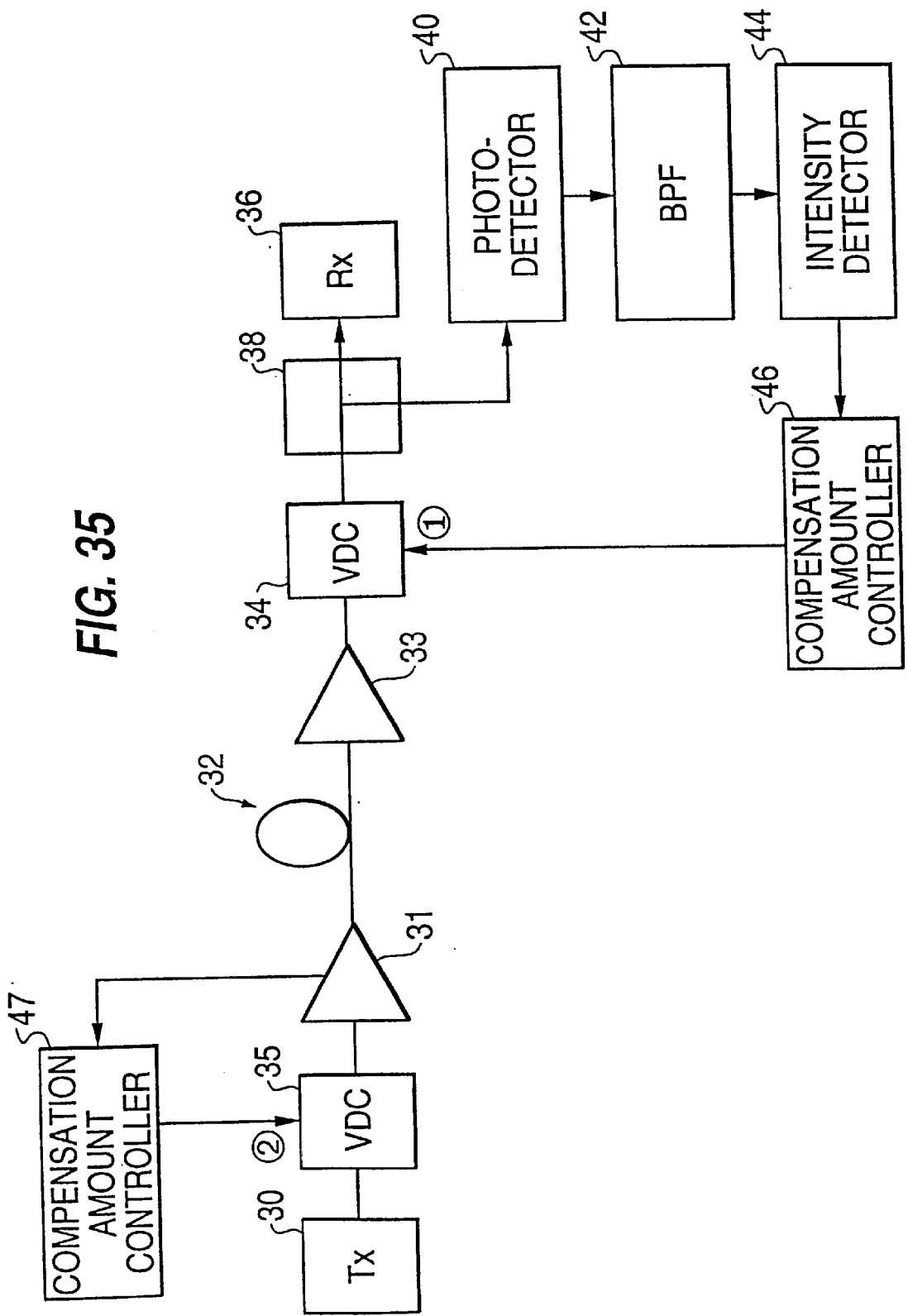
FIG. 35 is a diagram illustrating an additional modification of the automatic dispersion equalization system of FIG. 32, according to an embodiment of the present invention.

In this case, variable dispersion compensator 35 may be placed at the transmitting end, as shown in FIG. 35. In this embodiment, since variable dispersion compensator 35 can be placed near optical post-amplifier 31, there is no need to perform remote control across the transmission line and system operation can thus be simplified.

In the above embodiments of the present invention, the variable dispersion compensators are placed at the receiving and transmitting ends in a regenerative repeater system, but it will be appreciated that, in a nonregenerative optical amplifier repeater system, similar control can also be performed in a configuration where a variable dispersion compensator is also placed within an optical amplifier repeater.

According to the above embodiments of the present invention, it is possible to optimize the amount of dispersion compensation according to the transmitting optical power in an ultra high-speed optical transmission system using variable dispersion compensators.

Therefore, according to the above embodiments of the present invention, a method and apparatus is provided for controlling dispersion in an optical fiber transmission line. More specifically, the intensity of a specific frequency component of an optical signal transmitted through the transmission line is detected. The optical signal has an intensity v. total dispersion characteristic curve with a corresponding eye opening. The amount of total dispersion of the transmission line is controlled to substantially minimize the intensity of the specific frequency component in the eye opening. As a result, the total dispersion will be minimized as indicated, for example, by FIGS. 1 and 2.

Moreover, according to the above embodiments of the present invention, various types of optical signals as transmitted through a transmission line can be described as having an intensity v. total dispersion characteristic curve with at least two peaks. The amount of total dispersion of the transmission line can then be controlled to substantially minimize the intensity of the specific frequency component between the two highest peaks of the intensity v. total dispersion characteristic curve, as illustrated, for example, in FIGS. 1 and 2.

While is it preferable to minimize the intensity of the specific frequency component in the eye opening, in some circumstances it may be appropriate to simply cause the intensity to be inside the eye opening. For example, in some systems, the total dispersion corresponding to the intensity being inside the eye opening would be considered to be relatively low. Therefore, referring to FIGS. 1 and 2, the total dispersion can be controlled to simply maintain the intensity along a point on the intensity v. total dispersion characteristic curve which is inside the eye opening.

Therefore, according to the above embodiments of the present invention, the intensity of a specific frequency component of an optical signal transmitted through the transmission line is detected. The optical signal has an intensity v. total dispersion characteristic curve with a corresponding, allowable eye opening range. The amount of dispersion of the transmission line is controlled to maintain the intensity of the specific frequency component along a point on the intensity v. total dispersion characteristic curve which is within the eye opening.

Further, instead of controlling the dispersion to control the intensity of a specific frequency component, the intensity of the specific frequency component can simply be directly controlled. For example, the intensity can be controlled to substantially minimize the detected intensity in the eye opening.

Moreover, as previously described, it is often difficult to measure the eye opening. Therefore, the intensity of the specific frequency component can be controlled to substantially minimize the detected intensity between the two highest peaks of the intensity v. total dispersion characteristic curve.

According to the above embodiments of the present invention, it becomes possible to monitor and control transmission line dispersion for optical signals, such as NRZ and OTDM waveforms, whose clock component is at a minimum at zero dispersion, and transmission line dispersion can be controlled without interrupting system operation.

Therefore, according to the above embodiments of the present invention, transmission line dispersion is controlled for an optical signal whose clock component intensity does not become the greatest at zero dispersion, as in an NRZ signal or in an OTDM signal where a plurality of RZ signals are time-division multiplexed with their tails overlapping each other.

Therefore, according to the above embodiments of the present invention, chromatic dispersion is controlled in a transmission line transmitting an optical signal modulated by a data signal. More specifically, the intensity of a specific frequency component is detected from the optical signal transmitted through the transmission line. The amount of total dispersion of the transmission line is controlled so that the intensity of the detected specific frequency component becomes a minimum in the eye opening.

In addition, according to the above embodiments of the present invention, an apparatus and method are provided for detecting an amount of dispersion in a transmission line transmitting an optical signal modulated by a data signal. More specifically, the intensity of a specific frequency component is detected from the optical signal transmitted through the transmission line. The amount of total dispersion of the transmission line is determined from the intensity of the detected specific frequency component.

Further, according to the above embodiments of the present invention, a time-division multiplexed optical signal, modulated by an n·m bit/second data signal obtained by time-division multiplexing n optical signals each amplitude-modulated by an m bit/second data signal, is transmitted through the optical fiber transmission line. An n·m hertz or an m hertz frequency component is extracted from the time-division multiplexed optical signal received from the optical fiber transmission line. Dispersion in the optical fiber transmission line is made variable so that the extracted n·m hertz or m hertz frequency component exhibits a minimum value or a maximum value, respectively.

According to the above embodiments of the present invention, the intensity of a specific frequency component is substantially minimized. It is preferable to set the intensity at the actual minimum value. However, in practice, it is often difficult to completely minimize the intensity of a specific frequency component. Therefore, in most situations, the intensity of the specific frequency component could be considered to be substantially minimized if it is greater than or equal to the minimum intensity and less than or equal to 120% of the minimum intensity. Preferably, the intensity should be controlled to be greater than or equal to the minimum intensity and less than or equal to 110% of the minimum intensity.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising the steps of:
   determining an optimum amount of total dispersion of the optical transmission line corresponding to a power level of an optical signal transmitted through the optical transmission line;
   controlling dispersion of the optical transmission line so that the total dispersion up to a specific point along the optical transmission line becomes approximately zero; and
   adding dispersion to the optical transmission line to obtain the determined optimum amount of total dispersion.

2. A method as in claim 1, wherein the step of adding dispersion adds dispersion to the optical transmission line at a point which is downstream of the specific point.

3. A method as in claim 1, wherein the determining step determines the optimum amount in accordance with the output of an amplifier which amplifies the optical signal for reception from the optical transmission line.

4. A method as in claim 1, wherein
the step of controlling dispersion comprises the steps of
detecting the intensity of a specific frequency component of the optical signal, the optical signal having an intensity v. total dispersion characteristic curve with at least two peaks, and
controlling the amount of total dispersion of the transmission line to substantially minimize the intensity of the specific frequency component between the two highest peaks of the intensity v. total dispersion characteristic curve of the optical signal, and
the optical signal is modulated by a data signal having a bit rate of B bits/second, and the specific frequency component is a B hertz component of the optical signal.

5. A method as in claim 4, wherein the optical signal is a non-return-to-zero (NRZ) signal.

6. A method as in claim 1, wherein
the step of controlling dispersion comprises the steps of
detecting the intensity of a specific frequency component of the optical signal, the optical signal having an intensity v. total dispersion characteristic curve with at least two peaks, and
controlling the amount of total dispersion of the transmission line to substantially minimize the intensity of the specific frequency component between the two highest peaks of the intensity v. total dispersion characteristic curve of the optical signal, and
the specific frequency component corresponds to a bit rate of the optical signal.

7. A method as in claim 1, wherein the step of controlling dispersion comprises one of the group consisting of
a first processes of
detecting the intensity of a specific frequency component of the optical signal, the optical signal having an intensity v. total dispersion characteristic curve with at least two peaks, and
controlling the amount of total dispersion of the transmission line to substantially minimize the intensity of the specific frequency component between the two highest peaks of the intensity v. total dispersion characteristic curve of the optical signal, and
a second process of
detecting the intensity of a specific frequency component of the optical signal, and
maximizing the intensity of the detected specific frequency component.

8. A method as in claim 1, wherein the step of controlling dispersion maximizes the intensity of a specific frequency component in the optical signal.

9. A method as in claim 8, wherein the optical signal is a return-to-zero (RZ) signal.

10. A method as in claim 1, wherein
the optical signal is one of the group consisting of a non-return-to-zero (NRZ) signal, a return-to-zero (RZ) signal, and an optical time division multiplexed (OTDM) signal,
when the optical signal is an NRZ signal or an OTDM signal, the step of controlling dispersion comprises
detecting the intensity of a specific frequency component of the optical signal, the optical signal having an intensity v. total dispersion characteristic curve with at least two peaks, and
controlling the amount of total dispersion of the transmission line to substantially minimize the intensity of the specific frequency component between the two highest peaks of the intensity v. total dispersion characteristic curve of the optical signal, and
when the optical signal is an RZ signal, the step of controlling dispersion comprises
detecting the intensity of a specific frequency component of the optical signal, and
maximizing the intensity of the detected specific frequency component.

11. A method as in claim 1, wherein
the step of controlling dispersion comprises the steps of
detecting the intensity of a specific frequency component of the optical signal, the optical signal having an intensity v. total dispersion characteristic curve with at least two peaks, and
controlling the amount of total dispersion of the transmission line to substantially minimize the intensity of the specific frequency component between the two highest peaks of the intensity v. total dispersion characteristic curve of the optical signal, and
the intensity of the specific frequency component is minimized at a midpoint between the two highest peaks of the intensity v. total dispersion characteristic curve of the optical signal.

12. A method as in claim 1, wherein the step of controlling dispersion comprises the steps of:
detecting the intensity of a specific frequency component of the optical signal, the optical signal having an intensity v. total dispersion characteristic curve with at least two peaks; and
controlling the amount of total dispersion of the transmission line so that the intensity of the specific frequency component is at a midpoint between the two highest peaks of the intensity v. total dispersion characteristic curve of the optical signal.

13. A method as in claim 1, wherein the step of controlling dispersion comprises the steps of:
detecting the intensity of a specific frequency component of the optical signal, the optical signal having an intensity v. total dispersion characteristic curve with a corresponding eye opening; and
controlling the amount of total dispersion of the optical transmission line to substantially minimize the intensity of the specific frequency component in the eye opening.

14. A method as in claim 13, wherein the optical signal is modulated by a data signal having a bit rate of B bits/second, and the specific frequency component is a B hertz component of the optical signal.

15. A method as in claim 13, wherein the optical signal is one of the group consisting of a non-return-to-zero signal and an optical time division multiplexed (OTDM) signal.

16. A method as in claim 1, wherein the step of controlling dispersion comprises the steps of:
detecting the intensity of a specific frequency component of the optical signal, the optical signal having an intensity v. total dispersion characteristic curve with a corresponding eye opening range; and
controlling the amount of total dispersion of the transmission line to maintain the intensity of the specific frequency component along a point on the intensity v. total dispersion characteristic curve which is within the eye opening range.

17. A method as in claim 1, wherein the step of controlling dispersion controls dispersion in the optical transmission line by controlling a dispersion value of a variable dispersion compensator positioned upstream of the specific point.

18. A method as in claim 1, wherein the step of controlling dispersion controls dispersion in the optical transmission line by controlling a wavelength of the optical signal.

19. A method as in claim 1, wherein the determining step determines the optimum amount in accordance with the output of an amplifier which amplifies the optical signal for transmission through the optical transmission line.

20. An apparatus comprising:
a dispersion determining device determining an optimum amount of total dispersion of an optical transmission line corresponding to a power level of an optical signal transmitted through the optical transmission line;
a first dispersion controller controlling dispersion of the optical transmission line so that the total dispersion up to a specific point along the optical transmission line becomes approximately zero; and
a second dispersion controller adding dispersion to the optical transmission line to obtain the determined optimum amount of total dispersion.

21. A apparatus as in claim 20, wherein the dispersion determining device determines the optimum amount in accordance with the output of an amplifier which amplifies the optical signal for reception from the optical transmission line.

22. An apparatus as in claim 20, wherein the second dispersion controller adds dispersion to the optical transmission line at a point which is downstream of the specific point.

23. A apparatus as in claim 20, wherein the dispersion determining device determines the optimum amount in accordance with the output of an amplifier which amplifies the optical signal for transmission through the optical transmission line.

24. An apparatus as in claim 20, wherein
the first dispersion controller
detects the intensity of a specific frequency component of the optical signal, the optical signal having an intensity v. total dispersion characteristic curve with at least two peaks, and
controls the amount of total dispersion of the transmission line to substantially minimize the intensity of the specific frequency component between the two highest peaks of the intensity v. total dispersion characteristic curve of the optical signal, and
the optical signal is modulated by a data signal having a bit rate of B bits/second, and the specific frequency component is a B hertz component of the optical signal.

25. An apparatus as in claim 24, wherein the optical signal is a non-return-to-zero (NRZ) signal.

26. An apparatus as in claim 20, wherein
the first dispersion controller
detects the intensity of a specific frequency component of the optical signal, the optical signal having an intensity v. total dispersion characteristic curve with at least two peaks, and
controls the amount of total dispersion of the transmission line to substantially minimize the intensity of the specific frequency component between the two highest peaks of the intensity v. total dispersion characteristic curve of the optical signal, and
the specific frequency component corresponds to a bit rate of the optical signal.

27. An apparatus as in claim 20, wherein the first dispersion controller performs one of the group consisting of
a first processes of
detecting the intensity of a specific frequency component of the optical signal, the optical signal having an intensity v. total dispersion characteristic curve with at least two peaks, and
controlling the amount of total dispersion of the transmission line to substantially minimize the intensity of the specific frequency component between the two highest peaks of the intensity v. total dispersion characteristic curve of the optical signal, and
a second process of
detecting the intensity of a specific frequency component of the optical signal, and
maximizing the intensity of the detected specific frequency component.

28. An apparatus as in claim 20, wherein the first dispersion controller maximizes the intensity of a specific frequency component in the optical signal.

29. An apparatus as in claim 28, wherein the optical signal is a return-to-zero (RZ) signal.

30. An apparatus as in claim 20, wherein
the optical signal is one of the group consisting of a non-return-to-zero (NRZ) signal, a return-to-zero (RZ) signal, and an optical time division multiplexed (OTDM) signal,
when the optical signal is an NRZ signal or an OTDM signal, the first dispersion controller
detects the intensity of a specific frequency component of the optical signal, the optical signal having an intensity v. total dispersion characteristic curve with at least two peaks, and
controls the amount of total dispersion of the transmission line to substantially minimize the intensity of the specific frequency component between the two highest peaks of the intensity v. total dispersion characteristic curve of the optical signal, and
when the optical signal is an RZ signal, the first dispersion controller
detects the intensity of a specific frequency component of the optical signal, and
maximizes the intensity of the detected specific frequency component.

31. An apparatus as in claim 20, wherein
the first dispersion controller
detects the intensity of a specific frequency component of the optical signal, the optical signal having an intensity v. total dispersion characteristic curve with at least two peaks, and
controls the amount of total dispersion of the transmission line to substantially minimize the intensity of the specific frequency component between the two highest peaks of the intensity v. total dispersion characteristic curve of the optical signal, and
the intensity of the specific frequency component is minimized at a midpoint between the two highest peaks of the intensity v. total dispersion characteristic curve of the optical signal.

32. An apparatus as in claim 20, wherein the first dispersion controller
detects the intensity of a specific frequency component of the optical signal, the optical signal having an intensity v. total dispersion characteristic curve with at least two peaks, and
controls the amount of total dispersion of the transmission line so that the intensity of the specific frequency component is at a midpoint between the two highest peaks of the intensity v. total dispersion characteristic curve of the optical signal.

33. An apparatus as in claim 20, wherein the first dispersion controller detects the intensity of a specific frequency component of the optical signal, the optical signal having an intensity v. total dispersion characteristic curve with a corresponding eye opening, and controls the amount of total dispersion of the optical transmission line to substantially minimize the intensity of the specific frequency component in the eye opening.

34. An apparatus as in claim 33, wherein the optical signal is modulated by a data signal having a bit rate of B bits/second, and the specific frequency component is a B hertz component of the optical signal.

35. An apparatus as in claim 33, wherein the optical signal is one of the group consisting of a non-return-to-zero signal and an optical time division multiplexed (OTDM) signal.

36. An apparatus as in claim 20, wherein the first dispersion controller detects the intensity of a specific frequency component of the optical signal, the optical signal having an intensity v. total dispersion characteristic curve with a corresponding eye opening range, and controls the amount of total dispersion of the transmission line to maintain the intensity of the specific frequency component along a point on the intensity v. total dispersion characteristic curve which is within the eye opening range.

37. An apparatus as in claim 20, wherein the first dispersion controller comprises:

a dispersion compensator having a variable dispersion value and positioned upstream of the specific point, the first dispersion controller controlling dispersion in the optical transmission line by controlling the variable dispersion value of the variable dispersion compensator.

38. A apparatus as in claim 20, wherein the first dispersion controller controls dispersion in the optical transmission line by controlling a wavelength of the optical signal.

39. A method of controlling dispersion in an optical transmission line having an optical signal transmitted therethrough, comprising the steps of:

setting the power of the optical signal to a first value producing substantially no nonlinear effect in the optical transmission line;

controlling the amount of total dispersion of the optical transmission line to be approximately zero;

changing the power of the optical signal to a second value different from the first value;

determining an optimum amount of total dispersion of the optical transmission line corresponding to the power of the optical signal being at the second value; and adding dispersion to the optical transmission line to obtain the determined optimum amount of dispersion.

40. A method as in claim 39, wherein the optical transmission line is part of an optical communication system, the power of the optical signal being set to the first value corresponds to a time prior to starting the optical communication system, and the power of the optical signal being set to the second value corresponds to a time during operation of the optical communication system.

41. A method as in claim 39, wherein the second value indicates a higher optical signal power than the first level.

42. A method of controlling dispersion in an optical transmission line having an optical signal transmitted therethrough, comprising the steps of:

setting the power of the optical signal to a value producing substantially no nonlinear effect in the optical transmission line;

controlling the amount of total dispersion of the optical transmission line to be approximately zero while the power is set to said value;

increasing the power of the optical signal; and adding dispersion to the optical transmission line to obtain an optimum amount of dispersion corresponding to the increased power of the optical signal.

43. A method as in claim 42, wherein a first dispersion compensator is used by the controlling step to control the amount of total dispersion, and a second dispersion compensator is used by the adding step to add dispersion.

44. A method as in claim 43, wherein the first dispersion compensator is at one of the group consisting of a transmitting end and a receiving end of the optical transmission line, and the second dispersion compensator is at the other of the group consisting of the transmitting end and the receiving end of the optical transmission line.

45. A method as in claim 42, wherein the step of controlling comprises the steps of:

detecting the intensity of a specific frequency component of the optical signal, the optical signal having an intensity v. total dispersion characteristic curve with at least two peaks; and controlling the amount of total dispersion of the transmission line to substantially minimize the intensity of the specific frequency component between the two highest peaks of the intensity v. total dispersion characteristic curve of the optical signal.

46. A method as in claim 45, wherein the optical signal is modulated by a data signal having a bit rate of B bits/second, and the specific frequency component is a B hertz component of the optical signal.

47. A method as in claim 46, wherein the optical signal is a non-return-to-zero (NRZ) signal.

48. A method as in claim 45, wherein the specific frequency component corresponds to a bit rate of the optical signal.

49. A method as in claim 45, wherein the intensity of the specific frequency component is minimized at a midpoint between the two highest peaks of the intensity v. total dispersion characteristic curve of the optical signal.

50. A method as in claim 45, wherein the step of adding dispersion adds dispersion to the optical transmission line by controlling the amount of dispersion so that the intensity of the specific frequency component is brought to a value corresponding to the optimum amount of dispersion.

51. A method as in claim 42, wherein the step of controlling maximizes the intensity of a specific frequency component in the optical signal, and the optical signal is a return-to-zero (RZ) signal.

52. A method as in claim 42, wherein the optical signal is one of the group consisting of a non-return-to-zero (NRZ) signal, a return-to-zero (RZ) signal, and an optical time division multiplexed (OTDM) signal, when the optical signal is an NRZ signal or an OTDM signal, the step of controlling comprises detecting the intensity of a specific frequency component of the optical signal, the optical signal having an intensity v. total dispersion characteristic curve with at least two peaks, and controlling the amount of total dispersion of the transmission line to substantially minimize the intensity of the specific frequency component between the two highest peaks of the intensity v. total dispersion characteristic curve of the optical signal, and when the optical signal is an RZ signal, the step of controlling comprises detecting the intensity of a specific frequency component of the optical signal, and maximizing the intensity of the detected specific frequency component.

53. A method as in claim 42, wherein a single variable dispersion compensator is used by both the controlling step to control the amount of total dispersion and the adding step to add dispersion.

54. A method as in claim 42, wherein the step of controlling comprises the steps of:

detecting the intensity of a specific frequency component of the optical signal, the optical signal having an intensity v. total dispersion characteristic curve with at least two peaks; and controlling the amount of total dispersion of the transmission line so that the intensity of the specific frequency component is at a midpoint between the two highest peaks of the intensity v. total dispersion characteristic curve of the optical signal.

55. A method as in claim 42, wherein the step of controlling comprises the steps of:

detecting the intensity of a specific frequency component of the optical signal, the optical signal having an intensity v. total dispersion characteristic curve with a corresponding eye opening; and controlling the amount of total dispersion of the optical transmission line to substantially minimize the intensity of the specific frequency component in the eye opening.

56. A method as in claim 55, wherein the optical signal is modulated by a data signal having a bit rate of B bits/second, and the specific frequency component is a B hertz component of the optical signal.

57. A method as in claim 55, wherein the optical signal is one of the group consisting of a non-return-to-zero signal and an optical time division multiplexed (OTDM) signal.

58. A method as in claim 42, wherein the step of controlling comprises the steps of:

detecting the intensity of a specific frequency component of the optical signal, the optical signal having an intensity v. total dispersion characteristic curve with a corresponding eye opening range; and controlling the amount of total dispersion of the transmission line to maintain the intensity of the specific frequency component along a point on the intensity v. total dispersion characteristic curve which is within the eye opening range.

59. A method as in claim 42 further comprising, before the step of adding dispersion, the step of:

determining the optimum amount of dispersion in accordance with the output of an amplifier which amplifies the optical signal for transmission through the optical transmission line.

60. A method as in claim 42, further comprising, before the step of adding dispersion, the step of:

determining the optimum amount of dispersion in accordance with the output of an amplifier which amplifies the optical signal for reception from the optical transmission line.

61. A method as in claim 42, wherein the step of controlling comprises one of the group consisting of a first processes of detecting the intensity of a specific frequency component of the optical signal, the optical signal having an intensity v. total dispersion characteristic curve with at least two peaks, and controlling the amount of total dispersion of the transmission line to substantially minimize the intensity of the specific frequency component between the two highest peaks of the intensity v. total dispersion characteristic curve of the optical signal, and a second process of detecting the intensity of a specific frequency component of the optical signal, and maximizing the intensity of the detected specific frequency component.

62. An apparatus for controlling dispersion in an optical transmission line having an optical signal transmitted therethrough, comprising:

a power setting device setting the power of the optical signal to a value producing substantially no nonlinear effect in the optical transmission line;

a first dispersion controller controlling the amount of total dispersion of the optical transmission line to be approximately zero while the power is set to said value;

a power increasing device increasing the power of the optical signal; and a second dispersion controller adding dispersion to the optical transmission line to obtain an optimum amount of dispersion corresponding to the increased power of the optical signal.

63. An apparatus as in claim 62, wherein the first dispersion controller includes a dispersion compensator to control the amount of total dispersion, and the second dispersion controller includes a dispersion compensator to add dispersion.

64. An apparatus as in claim 63, wherein the dispersion compensator of the first dispersion controller is at one of the group consisting of a transmitting end and a receiving end of the optical transmission line, and the dispersion compensator of the second dispersion controller is at the other of the group consisting of the transmitting end and the receiving end of the optical transmission line.

65. An apparatus as in claim 62, further comprising:

a single variable dispersion compensator used by the first dispersion controller to control the amount of total dispersion and the second dispersion controller to add dispersion.

66. An apparatus as in claim 62, wherein the first dispersion controller:

detects the intensity of a specific frequency component of the optical signal, the optical signal having an intensity v. total dispersion characteristic curve with at least two peaks, and controls the amount of total dispersion of the transmission line to substantially minimize the intensity of the specific frequency component between the two highest peaks of the intensity v. total dispersion characteristic curve of the optical signal.

67. An apparatus as in claim 66, wherein the optical signal is modulated by a data signal having a bit rate of B bits/second, and the specific frequency component is a B hertz component of the optical signal.

68. An apparatus as in claim 67, wherein the optical signal is a non-return-to-zero (NRZ) signal.

69. An apparatus as in claim 66, wherein the specific frequency component corresponds to a bit rate of the optical signal.

70. An apparatus as in claim 66, wherein the intensity of the specific frequency component is minimized at a midpoint between the two highest peaks of the intensity v. total dispersion characteristic curve of the optical signal.

71. An apparatus as in claim 66, where in the second dispersion controller adds dispersion to the optical transmission line by controlling the amount of dispersion so that the intensity of the specific frequency component is brought to a value corresponding to the optimum amount of dispersion.

72. An apparatus as in claim 62, wherein the first dispersion controller performs one of the group consisting of
  a first processes of
    detecting the intensity of a specific frequency component of the optical signal, the optical signal having an intensity v. total dispersion characteristic curve with at least two peaks, and
    controlling the amount of total dispersion of the transmission line to substantially minimize the intensity of the specific frequency component between the two highest peaks of the intensity v. total dispersion characteristic curve of the optical signal, and
  a second process of
    detecting the intensity of a specific frequency component of the optical signal, and
    maximizing the intensity of the detected specific frequency component.

73. An apparatus as in claim 62, wherein
  the optical signal is one of the group consisting of a non-return-to-zero (NRZ) signal, a return-to-zero (RZ) signal, and an optical time division multiplexed (OTDM) signal,
  when the optical signal is an NRZ signal or an OTDM signal, the first dispersion controller
    detects the intensity of a specific frequency component of the optical signal, the optical signal having an intensity v. total dispersion characteristic curve with at least two peaks, and
    controls the amount of total dispersion of the transmission line to substantially minimize the intensity of the specific frequency component between the two highest peaks of the intensity v. total dispersion characteristic curve of the optical signal, and
  when the optical signal is an RZ signal, the first dispersion controller
    detects the intensity of a specific frequency component of the optical signal, and
    maximizes the intensity of the detected specific frequency component.

74. An apparatus as in claim 62, wherein the first dispersion controller maximizes the intensity of a specific frequency component in the optical signal.

75. An apparatus as in claim 74, wherein the optical signal is a return-to-zero (RZ) signal.

76. An apparatus as in claim 62, wherein the first dispersion controller
  detects the intensity of a specific frequency component of the optical signal, the optical signal having an intensity v. total dispersion characteristic curve with a corresponding eye opening, and
  controls the amount of total dispersion of the optical transmission line to substantially minimize the intensity of the specific frequency component in the eye opening.

77. An apparatus as in claim 76, wherein the optical signal is modulated by a data signal having a bit rate of B bits/second, and the specific frequency component is a B hertz component of the optical signal.

78. An apparatus as in claim 76, wherein the optical signal is one of the group consisting of a non-return-to-zero signal and an optical time division multiplexed (OTDM) signal.

79. An apparatus as in claim 62, wherein the first dispersion controller
  detects the intensity of a specific frequency component of the optical signal, the optical signal having an intensity v. total dispersion characteristic curve with a corresponding eye opening range, and
  controls the amount of total dispersion of the transmission line to maintain the intensity of the specific frequency component along a point on the intensity v. total dispersion characteristic curve which is within the eye opening range.

80. An apparatus as in claim 62 further comprising:
  an optimum amount determining device determining the optimum amount of dispersion in accordance with the output of an amplifier which amplifies the optical signal for transmission through the optical transmission line.

81. An apparatus as in claim 62, further comprising:
  an optimum amount determining device determining the optimum amount of dispersion in accordance with the output of an amplifier which amplifies the optical signal for reception from the optical transmission line.

82. A method comprising the steps of:
  determining an optimum amount of total dispersion of an optical transmission line corresponding to a power level of an optical signal trasmitted through the optical transmission line;
  controlling dispersion of the optical transmission line so that the total dispersion up to a specific point along the optical transmission line becomes approximately zero; and
  adding dispersion to the optical transmission line to obtain the determined optimum amount of total dispersion, wherein
    the step of controlling dispersion comprises the steps of
      detecting the intensity of a specific frequency component of the optical signal, the optical signal having an intensity v. total dispersion characteristic curve with at least two peaks, and
      controlling the amount of total disperion of the transmission line to substantially minimize the intensity of the specific frequency component between the two highest peaks of the intensity v. total dispersion charateristic curve of the optical signal, and
    the optical signal is modulated by a data signal having a bit rate of B bits/second, and specific frequency component is a B hertz component of the optical signal.

83. A method as in claim 82, wherein the optical signal is a non-return-to-zero (NRZ) signal.

84. A method comprising the steps of:
  determining an optimum amount of total dispersion of an optical transmission line corresponding to a power level of an optical signal transmitted through the optical transmission line;
  controlling dispersion of the optical transmission line so that the total dispersion up to a specific point along the optical transmission line becomes approximately zero; and adding dispersion to the optical transmission line to obtain the determined optimum amount of total dispersion, wherein the step of controlling dispersion comprises the steps of detecting the intensity of a specific frequency component of the optical signal, the optical signal having an intensity v. total dispersion charateristic curve with at least two peaks, and controlling the amount of total dispersion of the transmission line to substantially minimize the intensity of the specific frequency component between the two highest peaks of the intensity v. total dispersion charateristic curve of the optical signal, and the specific frequency component corresponds to a bit rate of the optical signal.

85. A method comprising the steps of:

determining an optimum amount of total dispersion of an optical transmission line corresponding to a power level of an optical signal transmitted through the optical transmission line;

controlling dispersion of the optical transmission line so that the total dispersion up to a specific point along the optical transmission line becomes approximately zero; and adding dispersion to the optical transmission line to obtain the determined optimum amount of total dispersion, wherein the step of controlling dispersion comprises the steps of detecting the intensity of a specific frequency component of the optical signal, the optical signal having an intensity v. total dispersion charateristic curve with at least two peaks, and controlling the amount of total dispersion of the tranmission line to substantially minimize the intensity of the specific frequency component between the two highest peaks of the intensity v. total dispersion charateristic curve of the optical signal, and the intensity of the specific frequency component is minimized at a midpoint between the two hightest peaks of the intensity v. total dispersion characteristic curve of the optical signal.

86. A method comprising the steps of:

determining an optimum amount of total dispersion of an optical transmission line corresponding to a power level of an optical signal transmitted through the optical transmission line;

controlling dispersion of the optical transmission line so that the total dispersion up to a specific point along the optical transmission line becomes approximately zero; and adding dispersion to the opticl transmission line to obtain the determined optimum amount of total dispersion, wherein the step of controlling dispersion comprises the steps of;

detecting the intensity of a specific frequency component of the optical signal, intensity of the specific frequency component is at a midpoint between the two highest peaks of the intensity v. total dispersion charateristic curve of the optical signal.

87. A method comprising the steps of:

determining an optimum amount of total dispersion of an optical transmission line corresponding to a power level of an optical signal transmitted through the optical transmission line;

controlling dispersion of the optical transmission line so that the total dispersion up to a spectific point along the optical transmission line becomes approximately zero; and adding dispersion to the optical transmission line to obtain the determined optimum amount of total dispersion, wherein the step of controlling dispersion comprises the step of:

detecting the intensity of a specific frequenct component of the opticla signal, the optical signal having an intensity v. total dispersion characteristic curve with a corresponding eye opening, and controlling the amount of total dispersion of the optical transmission line to substantially minimize the intensity of the specific frequency component in the eye opening.

88. A method as in claim 87, wherein the optical signal is modulated by a data signal having a bit rate of B bits/second, and the specific frequency component is a B hertz component of the optical signal.

89. A method as in claim 87, wherein the optical signal is one of the group consisting of a non-return-to-zero signal and an optical time division multiplexed (OTDM) signal.

90. An apparatus comprising:

a dispersion determining device determining an optimum amount of total dispersion of an optical transmission line corresponding to a power level of an optical signal transmitted through the optical transmission line;

a first dispersion controller controlling dispersion of the optical transmission line so that the total dispersion up to a specific point along the optical transmission line becomes approximately zero; and a second dispersion controller adding dispersion to the optical transmission line to obtain the determined optimum amount of total dispersion, wherein the first dispersion controlller detects the intensity of a specific frequency component of the optical signal, the optical signal having and intensity v. total dispersion characteristic curve with at least two peaks, and controls the amount of total dispersion of the transmission line to substantially minimize the intensity of the specific frequenct component between to two highest peaks of the intensity v. total dispersion characteristic curve of the optical signal, and the optical signal is modulated by a data signal having a bit rate of B bits/second, and the specific frequency component is a B hertz component of the optical signal.

91. An apparatus as in claim 90, wherein the optical signal is a non-return-to-zero (NRZ) signal.

92. An apparatus comprising:

a dispersion determining device determining an optimum amount of total dispersion of an optical transmission line corresponding to a power level of an optical signal transmitted through the optical transmission line;

a first dispersion controller controlling dispersion of the optical transmission line so that the total dispersion up to a specific point along the optical transmission line becomes approximately zero; and a second dispersion controller adding dispersion to the optical transmission line to obtain the determined optimum amount of total dispersion, wherein the first dispersion controlller detects the intensity of a specific frequency component of the optical signal, the optical signal having an intensity v. total dispersion characteristic curve with at least two peaks, and controls the amount of total dispersion of the transmission line to substantialy minimize the intensity of the specific frequency component between the two highest peaks of the intensity v. total dispersion characteristic curve of the optical signal, and the specific frequency component corresponds to a bit rate of the optical signal.

93. An apparatus comprising:

a dispersion determining device determining an optimum amount of total dispersion of an optical transmission line corresponding to a power level of an optical signal transmittted through the optical transmission line;

a first dispersion controller controlling dispersion of the optical transmission line so that the total dispersion up to a specific point along the optical transmision line becomes approximatelt zero; and a second dispersion controller adding dispersion to the optical transmission line to obtain the determined optimum amount of total dispersion, wherein
the first dispersion controller
detects the intensity of a specific frequency component of the optical signal, the optical signal having an intensity v. total dispersion characteristic curve with at least two peaks, and
controls the amount of total dispersion of the transmission line to substantially minimize the intensity of the specific frequenct component between the two highest peaks of the intensity v. total dispersion characteristic curve of the optical signal, and
the intensity of the specific frequency component is minimized at a midpoint between the two highest peaks of the intensity v. total dispersion characteristic curve of the optical signal.

94. An apparatus comprising:

a dispersion determining device determining an optimum amount of total dispersion of an optical transmission line corresponding to a power level of an optical signal transmitted through the optical transmission line;

a first dispersion controller controlling dispersion of the optical transmission line so that the total dispersion up to a specific point along the optical transmission line becomes approximately zero; and a second dispersion controller adding dispersion to the optical tranmission line to obtain the determined optimum amount of total dispersion, wherein the first dispersion controller
detects the intensity of the specific frequency component of the optical signal, the optical signal having an intensity v. total dispersion characteristic curve with at least two peaks, and
controls the amount of total dispersion of the tranmission line so that the intensity of the specific frequency component is at a midpoint between the two highest peaks of the intensity v. total dispersion characteristic curve of the optical signal.

95. An apparatus comprising:

a dispersion determining device determining an optimum amount of total dispersion of an optical transmission line corresponding to a power level of an optical signal transmitted through the optical transmission line;

a first dispersion controller controlling dispersion of the optical transmission line so that the total dispersion up to a specific point along the optical transmission line becomes approximately zero; and a second dispersion controller adding dispersion to the optical transmission line to obtain the determined optimum amount of total dispersion, wherein the first dispersion controller
detects the intensity of a specific frequency component of the optical signal, the optical signal having an intensity v. total dispersion characteristic with a corresponding eye opening, and
controls the amount of total dispersion of the optical transmission line to substantially minimize the intensity of the specific frequenct component in the eye opening.

96. An apparatus as in claim 95, wherein the optical signal is modulated by a data signal having a bit rate of B bits/second, and the specific frequency component is a B hertz component of the optical signal.

97. An apparatus as in claim 95, wherein to the optical signal is one of the group consisting of a non-return-to-zero signal and an optical time division multiplexed (OTDM) signal.

* * * * *

UNITED STATES PATENT AND TRADEMARK OFFICE
CERTIFICATE OF CORRECTION

PATENT NO. : 6,501,580 B1
DATED : December 31, 2002
INVENTOR(S) : George Ishikawa et al.

It is certified that error appears in the above-identified patent and that said Letters Patent is hereby corrected as shown below:

Title page,
Item [76], Inventors, the city of each inventor should be -- Kawasaki, Japan --.
Insert Item:
-- [73] Assignee: FUJITSU LIMITED, Kawasaki, Japan --.

Column 16,
Lines 52-62, replace claim 1 with the following:

> 1. A method comprising the steps of:
> detecting a power level of an optical signal transmitted through an optical transmission line;
> determining an optimum amount of total dispersion of the optical transmission line corresponding to the detected power level ;
> controlling dispersion of the optical transmission line so that the total dispersion up to a specific point along the optical transmission line becomes approximately zero; and
> adding dispersion to the optical transmission line to obtain the determined optimum amount of total dispersion.

Column 19,
Lines 8-19, replace claim 20 with the following:

> 20. An apparatus comprising:
> a detector detecting a power level of an optical signal transmitted through an optical transmission line;
> a dispersion determining device determining an optimum amount of total dispersion of the optical transmission line corresponding to the detected power level ;
> a first dispersion controller controlling dispersion of the optical transmission line so that the total dispersion up to a specific point along the optical transmission line becomes approximately zero; and
> a second dispersion controller adding dispersion to the optical transmission line to obtain the determined optimum amount of total dispersion.

Lines 20 and 28, change "A" to -- An --.

Column 21,
Lines 35 and 38, change "A" to -- An --.

Column 27,
Line 14, begin a new paragraph with -- the specific --.
Line 36, change "charateristic" to -- characteristic --.

UNITED STATES PATENT AND TRADEMARK OFFICE
CERTIFICATE OF CORRECTION

PATENT NO. : 6,501,580 B1
DATED : December 31, 2002
INVENTOR(S) : George Ishikawa et al.

It is certified that error appears in the above-identified patent and that said Letters Patent is hereby corrected as shown below:

Column 27 (cont'd),
Lines 42-58, replace claim 86 with the following:

> 86. A method comprising the steps of:
> determining an optimum amount of total dispersion of an optical transmission line corresponding to a power level of an optical signal transmitted through the optical transmission line;
> controlling dispersion of the optical transmission line so that the total dispersion up to a specific point along the optical transmission line becomes approximately zero; and
> adding dispersion to the optical transmission line to obtain the determined optimum amount of total dispersion, wherein the step of controlling dispersion comprises the steps of:
> detecting the intensity of a specific frequency component of the optical signal, the optical signal having an intensity v. total dispersion characteristic curve with at least two peaks; and
> controlling the amount of total dispersion of the transmission line so that the intensity of the specific frequency component is at a midpoint between the two highest peaks of the intensity v. total dispersion characteristic curve of the optical signal.

Column 28,
Line 5, change "frequenct" to -- frequency --.
Line 6, change "opticla" to -- optical --.

Signed and Sealed this

Seventeenth Day of August, 2004

JON W. DUDAS
*Acting Director of the United States Patent and Trademark Office*